US012657515B2

(12) United States Patent
Okawa

(10) Patent No.: US 12,657,515 B2
(45) Date of Patent: Jun. 16, 2026

(54) COMPUTER-READABLE RECORDING MEDIUM STORING MODEL GENERATION PROGRAM, MODEL GENERATION METHOD, AND MODEL GENERATION DEVICE

(71) Applicant: FUJITSU LIMITED, Kawasaki (JP)

(72) Inventor: Yoshihiro Okawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 648 days.

(21) Appl. No.: 18/164,088

(22) Filed: Feb. 3, 2023

(65) Prior Publication Data

US 2023/0186165 A1 Jun. 15, 2023

Related U.S. Application Data

(63) Continuation of application No. PCT/JP2020/035841, filed on Sep. 23, 2020.

(51) Int. Cl.
*G06N 20/00* (2019.01)

(52) U.S. Cl.
CPC .................................... *G06N 20/00* (2019.01)

(58) Field of Classification Search
CPC ....................................................... G06N 20/00
See application file for complete search history.

(56) References Cited

U.S. PATENT DOCUMENTS 9,336,484 B1 * 5/2016 Iverson ................ G06F 18/2433
10,599,984 B1 * 3/2020 Wubbels ................ G16H 30/40

10,810,512 B1 * 10/2020 Wubbels ................ G06N 20/20
10,970,650 B1 * 4/2021 Abusorrah ............. G06N 20/00
11,574,144 B2 * 2/2023 Mansour ................ G06N 20/00
2005/0154726 A1 7/2005 Mattausch et al.
(Continued)

FOREIGN PATENT DOCUMENTS

JP 2005-190429 A 7/2005
JP 2016-109495 A 6/2016
(Continued)

OTHER PUBLICATIONS

Khamassi, I., Sayed-Mouchaweh, M., Hammami, M., and Ghédira, K., "Ensemble Classifiers for Drift Detection and Monitoring in Dynamical Environments," Annual Conference of the PHM Society, vol. 5, No. 1, Oct. 2013 (Year: 2013).*

(Continued)

*Primary Examiner* — Barbara M Level
(74) *Attorney, Agent, or Firm* — Fujitsu Intellectual Property Center

(57) ABSTRACT

A non-transitory computer-readable recording medium stores a model generation program for causing a computer to execute a process including: acquiring results output from a first machine learning model in response to input of a first plurality of pieces of data to the first machine learning model; selecting a second plurality of pieces of data from the first plurality of pieces of data, based on the results; and generating a second machine learning model by executing machine learning of the first machine learning model, by using the second plurality of pieces of data as input, with some parameters being fixed among a plurality of parameters included in the first machine learning model.

12 Claims, 21 Drawing Sheets

(56)                    References Cited

U.S. PATENT DOCUMENTS

| | | | |
|---|---|---|---|
| 2012/0054184 A1* | 3/2012 | Masud | G06F 16/285 |
| | | | 707/E17.091 |
| 2013/0254153 A1* | 9/2013 | Marcheret | G06N 7/00 |
| | | | 706/59 |
| 2017/0330109 A1* | 11/2017 | Maughan | G06N 5/04 |
| 2018/0101770 A1 | 4/2018 | Tanaka et al. | |
| 2018/0121815 A1* | 5/2018 | Lamparter | G06N 5/022 |
| 2018/0307741 A1* | 10/2018 | Kida | G06N 3/0499 |
| 2019/0171428 A1* | 6/2019 | Patton | G06F 8/60 |
| 2020/0285994 A1* | 9/2020 | Tomoda | G06Q 30/0635 |
| 2020/0364561 A1* | 11/2020 | Ananthanarayanan | |
| | | | H04L 41/0843 |
| 2021/0350274 A1* | 11/2021 | Pfitzmann | G06F 11/3409 |
| 2021/0357679 A1* | 11/2021 | Bondugula | G06N 3/082 |

FOREIGN PATENT DOCUMENTS

| | | |
|---|---|---|
| JP | 2018-063504 A | 4/2018 |
| JP | 2020-052935 A | 4/2020 |

OTHER PUBLICATIONS

JPOA—Office Action of Japanese Patent Application No. 2022-551471 dated Nov. 14, 2023 with Machine Translation.

Ashkan Shabbak et al., "An Improvement of the Hotelling T2 Statistic in Monitoring Multivariate Quality Characteristics", Hindawi Publishing Corporation, Mathematical Problems in Engineering, vol. 2012, Article ID 531864, doi: 10.1155/2012/531864, pp. 1-15 (Total 15 pages).

International Search Report and Written Opinion of the International Searching Authority (Form PCT/ISA/210, 220, and 237), mailed in connection with PCT/JP2020/035841 and mailed Dec. 15, 2020 (Total 11 pages).

* cited by examiner

| RECORD NUMBER | TRAINING DATA | CORRECT ANSWER LABEL |
|---|---|---|
| 1001 | TRAINING DATA WITH RECORD NUMBER "1001" | FIRST CLASS |
| 1002 | TRAINING DATA WITH RECORD NUMBER "1002" | FIRST CLASS |
| 1003 | TRAINING DATA WITH RECORD NUMBER "1003" | FIRST CLASS |
| ... | ... | ... |
| 1050 | TRAINING DATA WITH RECORD NUMBER "1050" | SECOND CLASS |
| 1051 | TRAINING DATA WITH RECORD NUMBER "1051" | SECOND CLASS |
| ... | ... | ... |
| 1100 | TRAINING DATA WITH RECORD NUMBER "1100" | THIRD CLASS |
| 1101 | TRAINING DATA WITH RECORD NUMBER "1101" | THIRD CLASS |
| ... | ... | ... |

FIG. 9
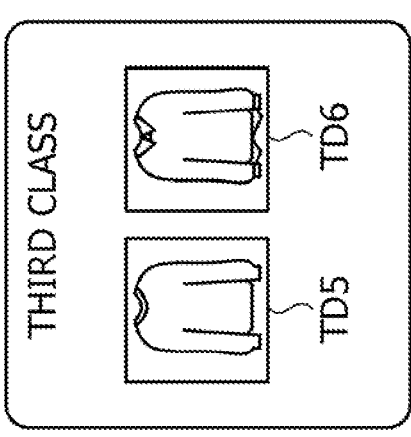
THIRD CLASS
TD5    TD6
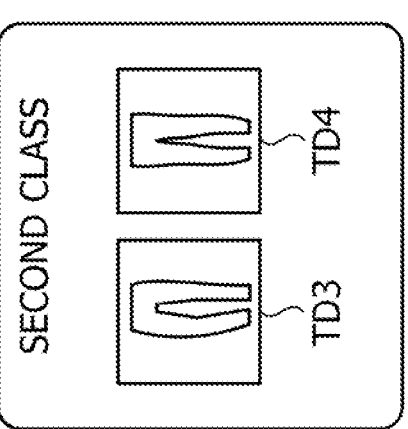
SECOND CLASS
TD3    TD4
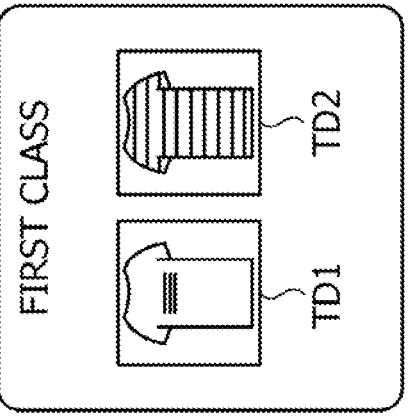
FIRST CLASS
TD1    TD2

FIG. 11

| IDENTIFICATION INFORMATION | INSPECTOR |
|---|---|
| M0 | DATA OF INSPECTOR WITH IDENTIFICATION INFORMATION "M0" |
| M1 | DATA OF INSPECTOR WITH IDENTIFICATION INFORMATION "M1" |
| M2 | DATA OF INSPECTOR WITH IDENTIFICATION INFORMATION "M2" |
| M3 | DATA OF INSPECTOR WITH IDENTIFICATION INFORMATION "M3" |

| DATA IDENTIFICATION INFORMATION | TRAINING DATA SET |
|---|---|
| D1 | TRAINING DATA SET WITH DATA IDENTIFICATION INFORMATION "D1" |
| D2 | TRAINING DATA SET WITH DATA IDENTIFICATION INFORMATION "D2" |
| D3 | TRAINING DATA SET WITH DATA IDENTIFICATION INFORMATION "D3" |

| DATA IDENTIFICATION INFORMATION | OPERATION DATA SET |
|---|---|
| C0 | OPERATION DATA SET WITH DATA IDENTIFICATION INFORMATION "C0" |
| C1 | OPERATION DATA SET WITH DATA IDENTIFICATION INFORMATION "C1" |
| C2 | OPERATION DATA SET WITH DATA IDENTIFICATION INFORMATION "C2" |
| C3 | OPERATION DATA SET WITH DATA IDENTIFICATION INFORMATION "C3" |

FIG. 21

COMPUTER-READABLE RECORDING MEDIUM STORING MODEL GENERATION PROGRAM, MODEL GENERATION METHOD, AND MODEL GENERATION DEVICE

CROSS-REFERENCE TO RELATED APPLICATION

This application is a continuation application of International Application PCT/JP2020/035841 filed on Sep. 23, 2020 and designated the U.S., the entire contents of which are incorporated herein by reference.

FIELD

The embodiments discussed herein are related to a model generation technique using training data.

BACKGROUND

In recent years, the introduction of machine learning models having data determination function and classification function and the like into information systems used by companies and the like has been progressing. Hereinafter, the information system will be expressed as a "system". Since the machine learning model performs determination and classification according to training data that the machine learning model has been trained with at the time of system development, the accuracy of the machine learning model deteriorates if the tendency of input data changes during the system operation.

A. Shabbak and H. Midi, "*An Improvement of the Hotelling Statistic in Monitoring Multivariate Quality Characteristics*", Mathematical Problems in Engineering (2012) 1-15. is disclosed as related art.

SUMMARY

According to an aspect of the embodiments, a non-transitory computer-readable recording medium stores a model generation program for causing a computer to execute a process including: acquiring results output from a first machine learning model in response to input of a first plurality of pieces of data to the first machine learning model; selecting a second plurality of pieces of data from the first plurality of pieces of data, based on the results; and generating a second machine learning model by executing machine learning of the first machine learning model, by using the second plurality of pieces of data as input, with some parameters being fixed among a plurality of parameters included in the first machine learning model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of a data structure of a training data set;

FIG. 9 is a diagram illustrating an example of training data;

FIG. 11 is a diagram illustrating an example of a data structure of an inspector table;

FIG. 12 is a diagram illustrating an example of a data structure of a training data table;

FIG. 13 is a diagram illustrating an example of a data structure of an operation data table;

FIG. 21 is a diagram for explaining the deterioration of the machine learning model due to changes in the tendency of input data.

DESCRIPTION OF EMBODIMENTS

Figure 21:
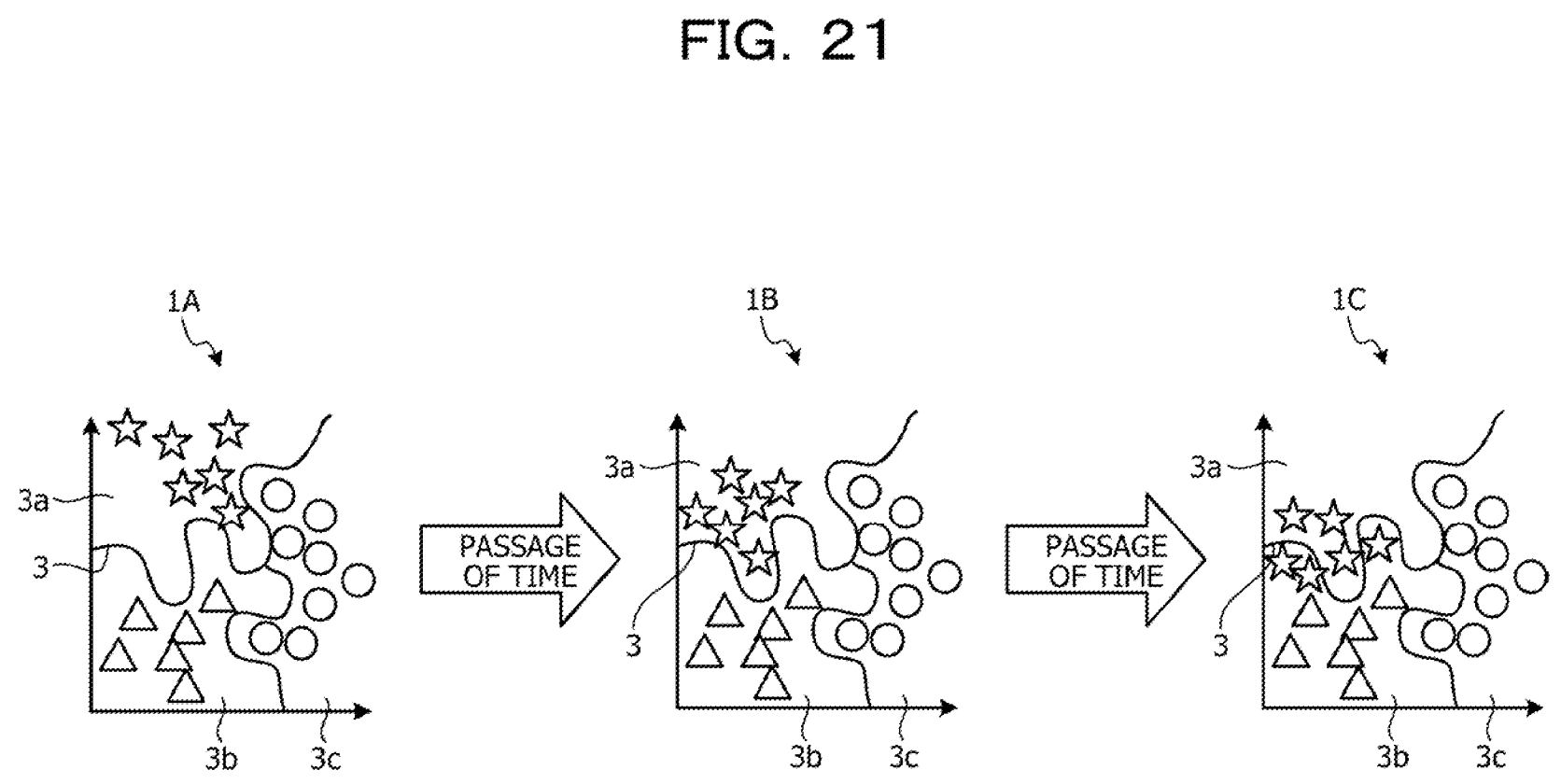
Figure 1:
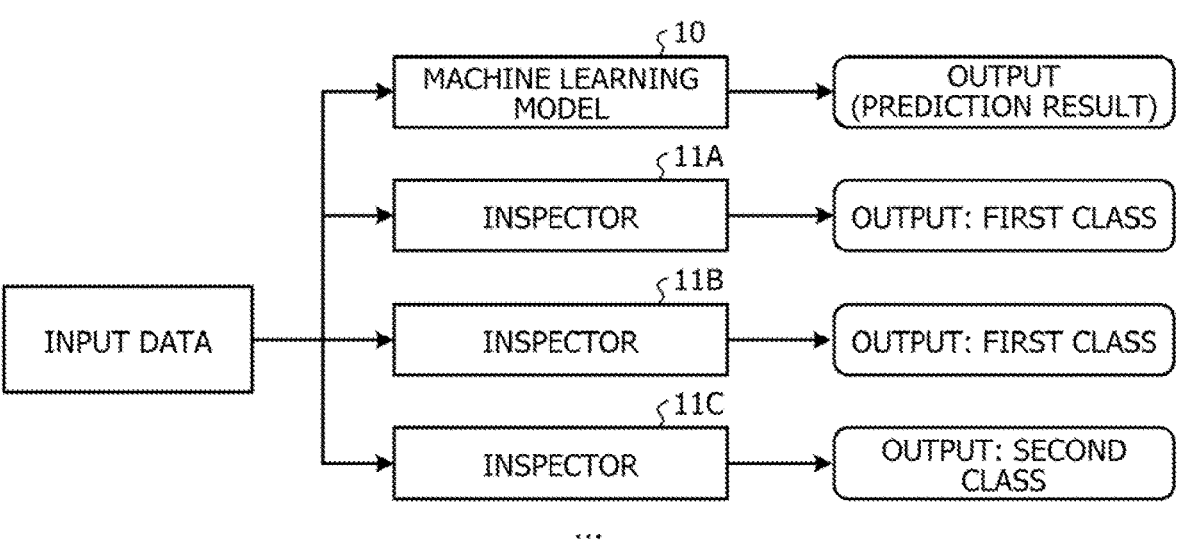
FIG. 1 is a diagram for explaining a reference technique.

FIG. 21 is a diagram for explaining the deterioration of the machine learning model due to changes in the tendency of the input data. It is assumed that the machine learning model described here is a model that classifies the input data into one of a first class, a second class, and a third class and is pre-trained based on the training data before system operation.

In FIG. 21, a distribution 1A illustrates a distribution of the input data at the initial stage of system operation. A distribution 1B illustrates a distribution of the input data at the time point when T1 hours have passed since the initial stage of system operation. A distribution 1C illustrates a distribution of the input data at the time point when T2 hours have further passed since the initial stage of system operation. It is assumed that the tendency (the feature amount and the like) of the input data changes with the passage of time. For example, if the input data is an image, the tendency of the input data changes depending on seasons and given times even in images in which the same subject is captured.

A decision boundary 3 indicates the boundary between model application areas 3a to 3c. For example, the model application area 3a is an area in which training data belonging to the first class is distributed. The model application area 3b is an area in which training data belonging to the second class is distributed. The model application area 3c is an area in which training data belonging to the third class is distributed.

The star marks represent the input data belonging to the first class, for which it is correct to be classified into the model application area 3a when input to the machine learning model. The triangle marks represent the input data belonging to the second class, for which it is correct to be classified into the model application area 3b when input to the machine learning model. The circle marks represent the input data belonging to the third class, for which it is correct to be classified into the model application area 3c when input to the machine learning model.

In the distribution 1A, all pieces of the input data are distributed in the normal model application areas. For example, the input data of the star marks is located in the model application area 3a, the input data of the triangle marks is located in the model application area 3b, and the input data of the circle marks is located in the model application area 3c.

In the distribution 1B, since the tendency of the input data has changed, all pieces of the input data are distributed in the normal model application areas, but the distribution of the input data of the star marks has changed in the direction of the model application area 3b.

In the distribution 1C, the tendency of the input data has further changed, and a part of the input data of the star marks has moved across the decision boundary 3 to the model application area 3b and is no longer properly classified, which decreases the correct answer rate (deteriorates the accuracy of the machine learning model).

Here, as a technique for detecting the accuracy deterioration of the machine learning model during operation, there is a prior technique using T2 statistic (Hotelling's T-square). In this prior technique, the data group of the input data and the normal data (training data) are analyzed by principal component analysis, and the T2 statistic of the input data is calculated. The T2 statistic is obtained by summing up the squares of the distances from the origin to the data of each standardized principal component. The prior technique detects the accuracy deterioration of the machine learning model based on a change in distribution of the T2 statistic of the input data group. For example, the T2 statistic of the input data group corresponds to the percentage of outlier data.

However, the above prior technique has a problem that it is impracticable to detect a change in distribution of data that is likely to cause the accuracy deterioration of the machine learning model.

For example, in high-dimensional (thousands to tens of thousands of dimensions) data that originally has a very large amount of information, most of the information will be lost when the dimensions are reduced by principal component analysis as in the prior technique. Thus, even important information (feature amount) for performing classification and determination disappears, and it is impracticable to detect a change in distribution of data that is likely to cause the accuracy deterioration of the machine learning model.

In one aspect, an object of the embodiments is to provide a model generation program, a model generation method, and a model generation device capable of detecting a change in distribution of data that is likely to cause accuracy deterioration of a machine learning model.

Hereinafter, embodiments of a model generation program, a model generation method, and a model generation device disclosed in the present application will be described in detail with reference to the drawings. Note that the present embodiments are not limited to the following embodiments.

Before explaining the present embodiments, a reference technique for detecting the accuracy deterioration of a machine learning model will be described. In the reference technique, the accuracy deterioration of the machine learning model is detected using a plurality of monitors for which model application areas are narrowed under different conditions. In the following description, the monitors will be expressed as "inspectors".

FIG. 1 is a diagram for explaining the reference technique. A machine learning model 10 is a machine learning model that has executed machine learning using training data. In the reference technique, the accuracy deterioration of the machine learning model 10 is detected. The training data is used when machine learning is executed for parameters of the machine learning model 10 and is associated with correct answer labels. Note that, in the reference technique, the machine learning model 10 is verified using verification data.

Inspectors 11A, 11B, and 11C have model application areas narrowed under different conditions from each other and have different decision boundaries. Since the inspectors 11A to 11C have different decision boundaries from each other, output results sometimes differ even if the same input data is input. In the reference technique, the accuracy deterioration of the machine learning model 10 is detected based on variations in the output results of the inspectors 11A to 11C.

In the example illustrated in FIG. 1, the inspectors 11A to 11C are illustrated, but the accuracy deterioration may be detected using another inspector. A deep neural network (DNN) is used for machine learning models for the inspectors 11A to 11C. The inspector 11A is assumed to be a machine learning model that has executed machine learning using the same training data as the training data for the machine learning model 10.

Figure 2:
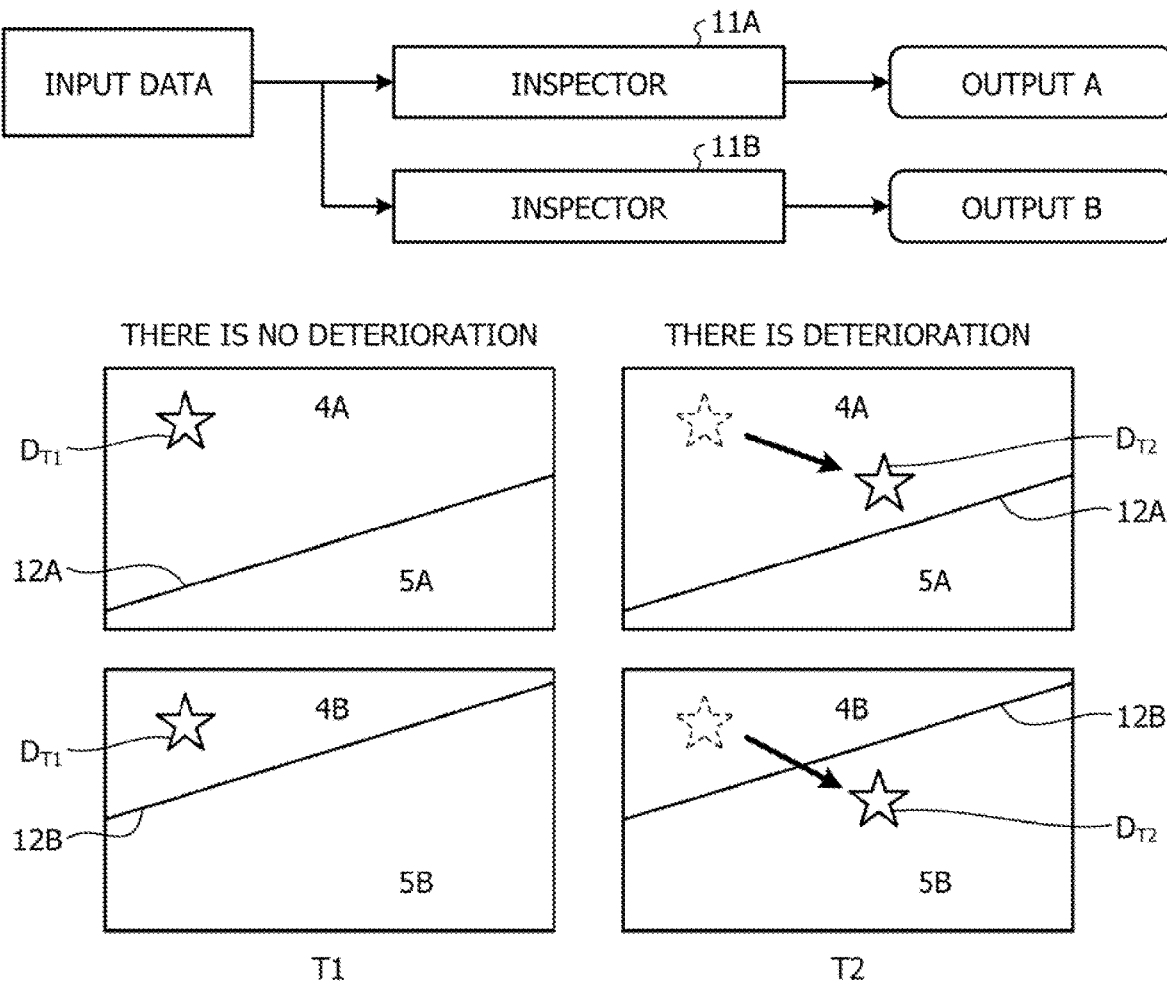
FIG. 2 is a diagram for explaining a mechanism for detecting accuracy deterioration of a machine learning model to be monitored.

FIG. 2 is a diagram for explaining a mechanism for detecting the accuracy deterioration of the machine learning model to be monitored. In FIG. 2, the inspectors 11A and 11B will be used for explanation. The decision boundary of the inspector 11A is assumed as a decision boundary 12A, and the decision boundary of the inspector 11B is assumed as a decision boundary 12B. The positions of the decision boundary 12A and the decision boundary 12B are different from each other, which forms different model application areas.

When the input data is located in a model application area 4A, the input data is classified by the inspector 11A into the first class. When the input data is located in a model application area 5A, the input data is classified by the inspector 11A into the second class.

When the input data is located in a model application area 4B, the input data is classified by the inspector 11B into the first class. When the input data is located in a model application area 5B, the input data is classified by the inspector 11B into the second class.

For example, when input data $D_{T1}$ is input to the inspector 11A at a time T1 in the initial stage of operation, the input data $D_{T1}$ is positioned in the model application area 4A and therefore classified into the "first class". When the input data $D_{T1}$ is input to the inspector 11B, the input data $D_{T1}$ is positioned in the model application area 4B and therefore classified into the "first class". Since the classification results when the input data $D_{T1}$ is input are the same between the inspector 11A and the inspector 11B, it is determined that "there is no deterioration".

At a time T2 when some time has passed since the initial stage of operation, the input data changes in tendency and becomes input data $D_{T2}$. When the input data $D_{T2}$ is input to the inspector 11A, the input data $D_{T2}$ is positioned in the model application area 4A and therefore classified into the "first class". On the other hand, when the input data $D_{T2}$ is input to the inspector 11B, the input data $D_{T2}$ is positioned in the model application area 4B and therefore classified into the "second class". Since the classification results when the input data $D_{T2}$ is input differ between the inspector 11A and the inspector 11B, it is determined that "there is deterioration".

Here, in the reference technique, when an inspector with a narrowed model application range is generated, a data set of training data obtained by excluding training data with a low score from the same data set of training data as the data set of training data for the machine learning model to be monitored is used to execute machine learning of the inspector. In the following description, the data set of training data will be expressed as "training data set". The training data set includes a plurality of pieces of training data. For example, a value that is calculated while the machine learning model classifies (infers) training data is treated as a score.

Figure 3:
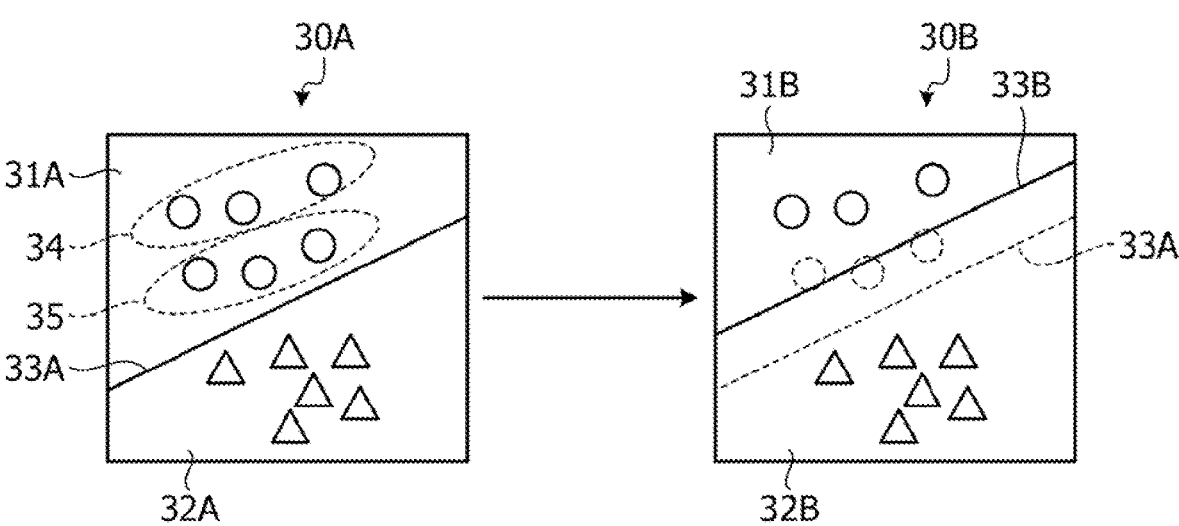
FIG. 3 is a diagram (1) for explaining processing of a reference technique.

FIG. 3 is a diagram (1) for explaining processing of the reference technique. In FIG. 3, for convenience of explanation, a case where the correct answer label (classification class) of the training data is the first class or the second class will be described. The circle marks represent training data whose correct answer labels have the first class. The triangle marks represent training data whose correct answer labels have the second class.

A distribution 30A illustrates a distribution of the training data set for creating the inspector 11A. The training data set for when training the inspector 11A will be assumed to be the same training data set as the training data set for when training the machine learning model 10 to be monitored. The decision boundary between a model application area 31A of the first class and a model application area 32A of the second class is defined as a decision boundary 33A.

When an existing machine learning model (DNN) is used for the inspector 11A, the score for each piece of training data has a smaller value as the training data becomes closer to the decision boundary of that machine learning model. Accordingly, by training using a new training data set obtained by excluding training data with a smaller score among the plurality of pieces of training data, from the training data set, an inspector with a narrowed application area of the machine learning model can be generated.

In the distribution 30A, each piece of training data contained in an area 34 has a higher score because these pieces of training data are farther from the decision boundary 33A. Each piece of training data contained in an area 35 has a lower score because these pieces of training data are closer to the decision boundary 33A. A device that executes the reference technique creates a new training data set in which the respective pieces of training data contained in the area 35 have been deleted from the training data set included in the distribution 30A. In the following description, the device that executes the reference technique will be expressed as a "reference device".

The reference device generates the inspector 11B by executing machine learning of the machine learning model with the new training data set. A distribution 30B illustrates a distribution of the new training data set for generating the inspector 11B. The decision boundary between a model application area 31B of the first class and a model application area 32B of the second class is defined as a decision boundary 33B. In the new training data set, since each piece of training data in the area 35 closer to the decision boundary 33A has been excluded, the position of the decision boundary 33B has moved, and the model application area 31B of the first class is narrower than the model application area 31A of the first class.

Figure 4:
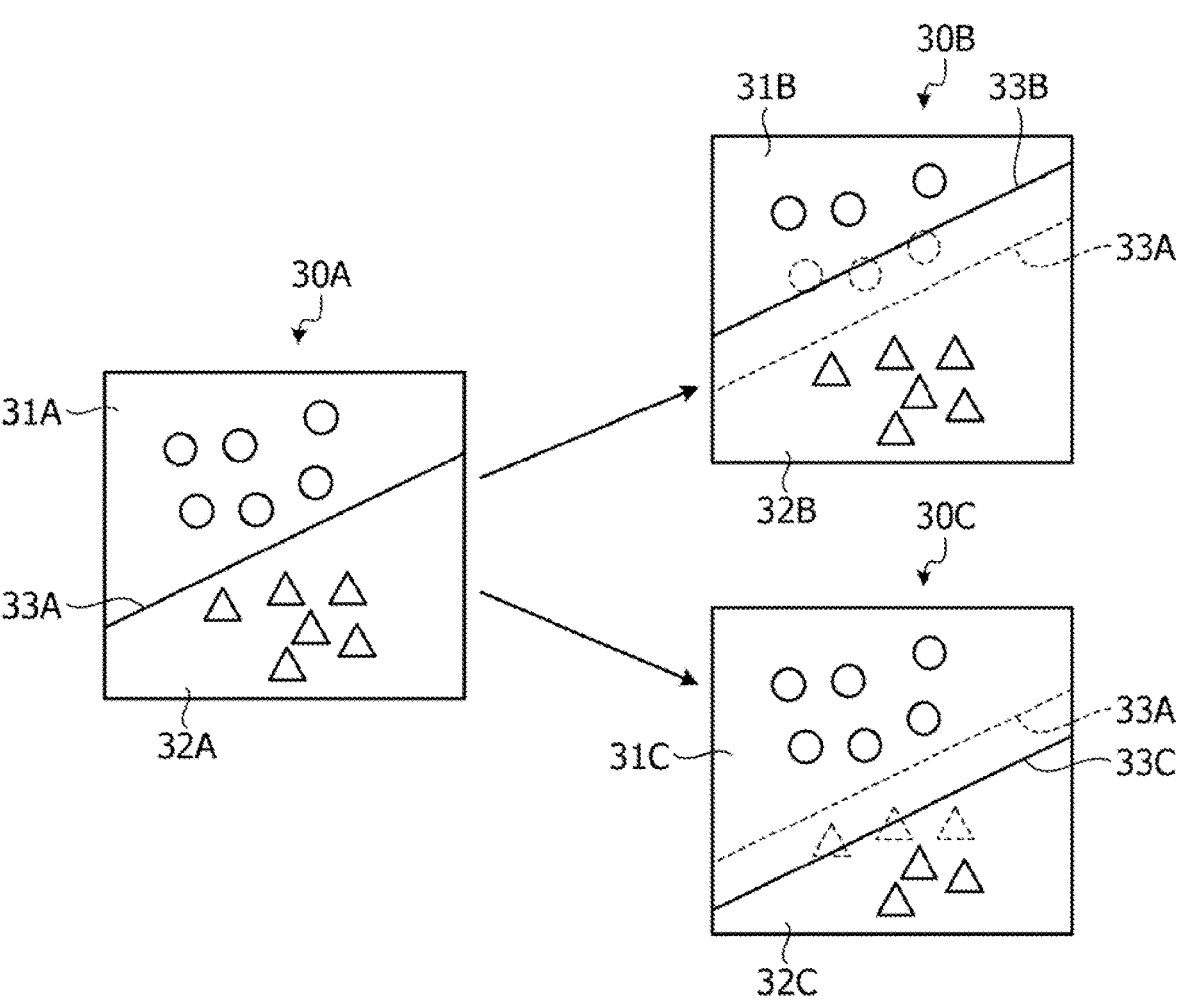
FIG. 4 is a diagram (2) for explaining processing of the reference technique.

FIG. 4 is a diagram (2) for explaining processing of the reference technique. The reference device narrows the model application area of a specified classification class by designating a classification class from the training data and excluding data with a lower score.

Here, each piece of training data is associated with a correct answer label indicating a classification class. Processing in which the reference device generates the inspector 11B with a narrowed model application area corresponding to the first class will be described. The reference device executes machine learning of the inspector 11B, using a first training data set obtained by excluding training data with a lower score whose correct answer label has the "first class", from the training data set.

Here, the distribution 30A illustrates a distribution of the training data set for generating the inspector 11A. It is assumed that the training data set for generating the inspector 11A is the same as the training data set used when conducting machine learning of the machine learning model 10 to be monitored. The decision boundary between the model application area 31A of the first class and the model application area 32A of the second class is defined as the decision boundary 33A.

The reference device calculates the score of the training data by inputting each piece of training data whose correct answer label in the training data set included in the distribution 30A has the "first class", to the inspector 11A, and specifies training data whose score is less than a threshold value. The reference device newly creates the first training data set in which the specified training data has been excluded from the training data set included in the distribution 30A. The training data whose correct answer label has the "second class" remains in the first training data set.

The reference device executes machine learning of the inspector 11B, using the first training data set. The distribution 30B illustrates a distribution of the first training data set. The decision boundary between the model application area 31B of the first class and the model application area 32B of the second class is defined as the decision boundary 33B. In the first training data set, since each piece of training data closer to the decision boundary 33A has been excluded, the position of the decision boundary 33B has moved, and the model application area 31B of the first class is narrower than the model application area 31A of the first class.

Subsequently, processing in which the reference device creates the inspector 11C with a narrowed model application area corresponding to the second class will be described. The reference device executes machine learning of the inspector 11C, using a second training data set obtained by excluding training data with a lower score whose correct answer label has the "second class", from the training data set.

The reference device calculates the score of the training data by inputting each piece of training data whose correct answer label in the training data set included in the distribution 30A has the "second class", to the inspector 11A, and specifies training data whose score is less than a threshold value. The reference device newly creates the second training data set in which the specified training data has been excluded from the training data set included in the distribution 30A. The training data whose correct answer label has the "first class" remains in the second training data set.

The reference device executes machine learning of the inspector 11C, using the second training data set. A distribution 30C illustrates a distribution of the second training data set. The decision boundary between a model application area 31C of the first class and a model application area 32C of the second class is defined as a decision boundary 33C. In the second training data set, since each piece of training data closer to the decision boundary 33A has been excluded, the position of the decision boundary 33C has moved, and the model application area 32C of the second class is narrower than the model application area 32A of the second class.

As described above, in the reference technique, the model application area is narrowed by executing machine learning of the inspector using a training data set obtained by excluding training data with a lower score for each classification class from the training data set used for machine learning of the machine learning model to be monitored.

Here, a problem of the reference technique will be described. In the reference technique, the computational cost when executing machine learning of the inspector with a narrowed model application range for a certain specified classification class is comparable to the computational cost of executing machine learning of the machine learning model to be monitored. Therefore, as the number of classification classes becomes larger, the computational cost when executing machine learning of a plurality of inspectors corresponding to the classification classes also increases proportionally.

In addition, after a decrease in accuracy of the machine learning model to be monitored is detected using the plurality of inspectors for which machine learning has been executed, machine learning of the machine learning model and the inspectors for each classification class will be executed again using the latest training data set in order to restore the accuracy that has decreased.

Figure 5:
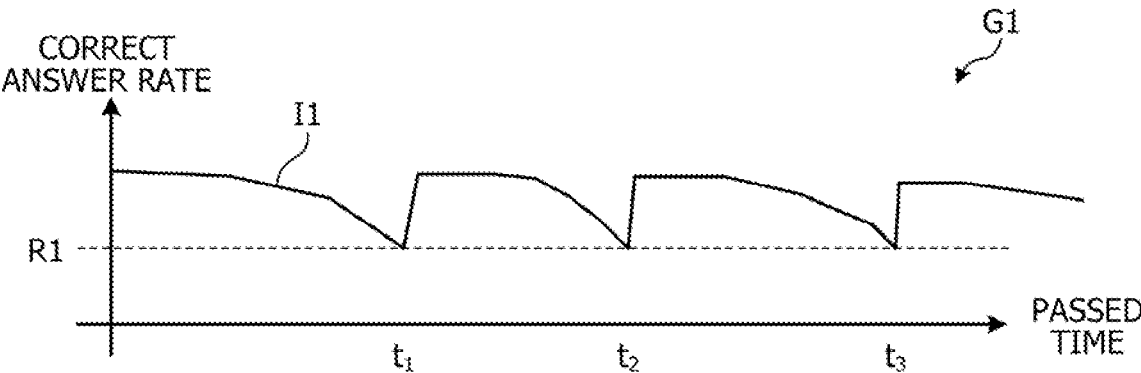
FIG. 5 is a diagram for explaining a problem in the reference technique.

FIG. 5 is a diagram for explaining a problem in the reference technique. The horizontal axis of a graph G1 in FIG. 5 represents the axis corresponding to the passed time, and the vertical axis represents the axis corresponding to the correct answer rate of the machine learning model. A line segment I1 indicates the relationship between the passed time and the correct answer rate of the machine learning model. At timings $t_1$, $t_2$, and $t_3$ when the line segment I1 becomes equal to or less than a correct answer rate R1, the accuracy of the machine learning model falls below the permissible performance, and machine learning of the machine learning model and each inspector is executed again.

For example, when the number of classification classes is assumed as $n_c$, machine learning of the machine learning model to be monitored and $n_c$ inspectors is executed at the timings $t_1$, $t_2$, and $t_3$. For this reason, in the reference technique, the computational cost pertaining to the continuous operation of the machine learning model and each inspector grows larger.

Figure 6:
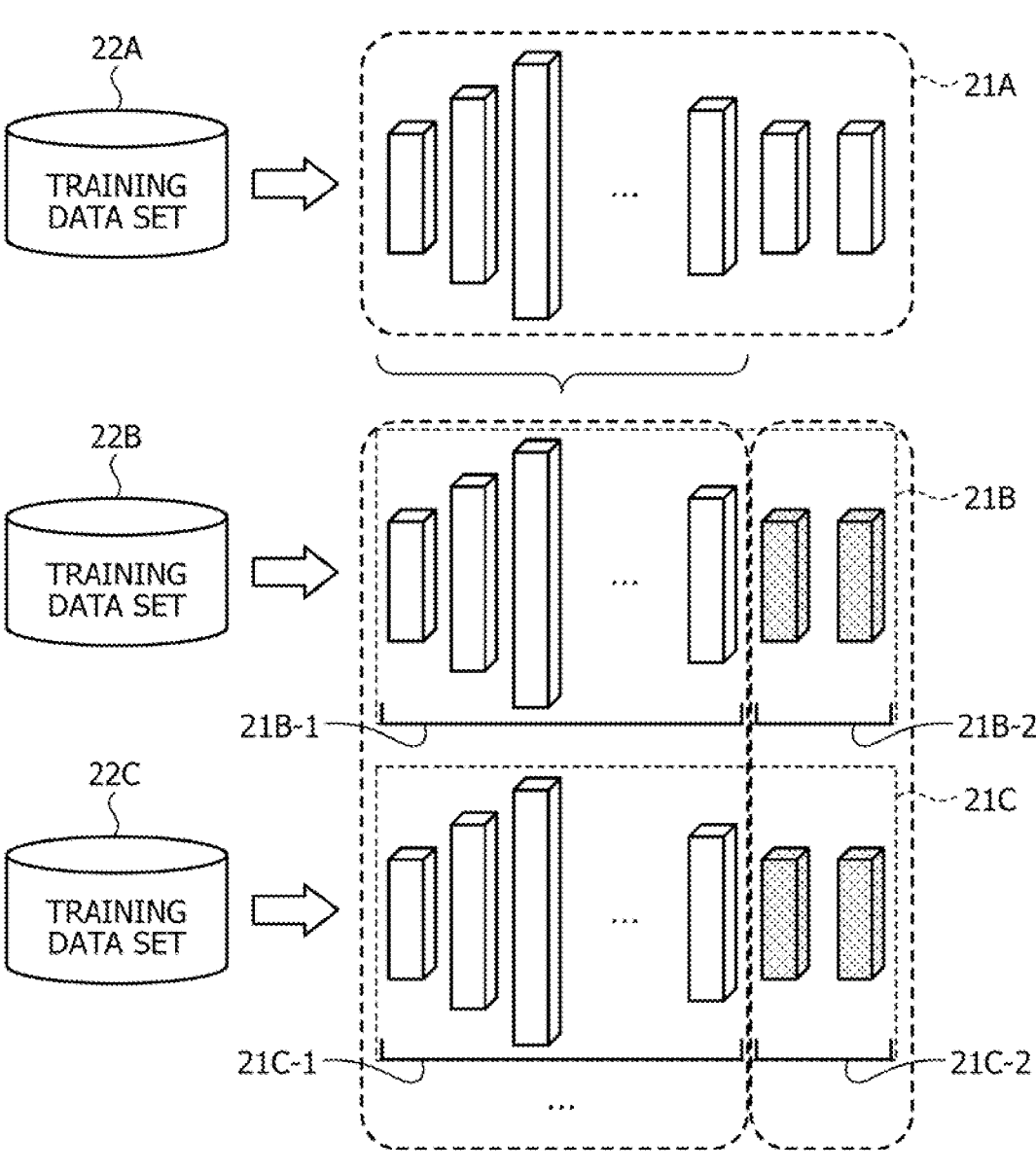
FIG. 6 is a diagram for explaining processing of a model generation device according to the present embodiment.

Next, an example of processing of the model generation device according to the present embodiment will be described. FIG. 6 is a diagram for explaining processing of the model generation device according to the present embodiment. The model generation device according to the present embodiment executes machine learning of inspectors 21A to 21C by performing the following processing. In the present embodiment, machine learning models for the inspectors 21A to 21C are implemented by the DNN.

For example, the inspectors 21A to 21C have a neural network structure and have an input layer, a plurality of hidden layers, and an output layer. The input layer, the plurality of hidden layers, and the output layer have a structure in which a plurality of nodes is coupled by edges. The plurality of hidden layers and the output layer have a function called an activation function and bias values, and the edges have weights. In the following description, the bias values set in the plurality of hidden layers and the output layer, and the weights are expressed as "parameters". In addition, the input layer, the plurality of hidden layers, and the output layer are collectively expressed as a "plurality of layers".

The model generation device uses a training data set 22A to execute machine learning of the inspector 21A. This trains the parameters of the plurality of layers of the inspector 21A. The training data set 22A is assumed to be the same training data set as the training data set for when executing machine learning of the machine learning model to be monitored. After executing machine learning of the inspector 21A, the model generation device inputs each piece of training data of the training data set 22A to the inspector 21A to calculate the score of the "first class" and the score of the "second class" for each piece of training data.

The model generation device creates a training data set 22B by excluding training data with the correct answer label "first class" that has a score less than a threshold value, from the training data set 22A. The training data with the correct answer label "second class" remains in the training data set 22B.

The model generation device creates a training data set 22C by excluding training data with the correct answer label "second class" that has a score less than a threshold value, from the training data set 22A. The training data with the correct answer label "first class" remains in the training data set 22C.

The model generation device sets the same parameters as the parameters trained by executing machine learning of the inspector 21A, in the plurality of layers of the inspector 21B and the inspector 21C.

The model generation device takes the training data set 22B as input and executes machine learning of the inspector 21B. When executing machine learning of the inspector 21B, the model generation device executes the machine learning with some parameters among a plurality of the parameters set in the plurality of layers fixed. In the example illustrated in FIG. 6, each parameter of a plurality of layers 21B-1 of the inspector 21B is fixed, and each parameter of a plurality of layers 21B-2 is finely adjusted (fine-tuned).

By executing machine learning by backpropagation, the model generation device trains the parameters of the plurality of layers 21B-2 such that the output results when each piece of training data of the training data set 22B is input to the inspector 21B approach the correct answer labels for each piece of training data.

The model generation device takes the training data set 22C as input and executes machine learning of the inspector 21C. When executing machine learning of the inspector 21C, the model generation device executes the machine learning with some parameters among a plurality of the parameters set in the plurality of layers fixed. In the example illustrated in FIG. 6, each parameter of a plurality of layers 21C-1 of the inspector 21C is fixed, and the parameters of a plurality of layers 21C-2 are finely adjusted (fine-tuned).

By executing machine learning by backpropagation, the model generation device trains the parameters of the plurality of layers 21C-2 such that the output results when each piece of training data of the training data set 22C is input to the inspector 21C approach the correct answer labels for each piece of training data.

As described above, when executing machine learning of the inspectors 21B and 21C, the model generation device reuses a plurality of trained parameters of the inspector 21A and executes machine learning with some parameters fixed. Therefore, the computational cost of the inspectors 21B and 21C may be implemented at a lower computational cost than the computational cost of the inspector 21A. Since the computational cost of the inspectors 21B and 21C can be implemented at a lower computational cost, the computational cost involved in continuous operation monitoring of the machine learning model may be reduced.

In addition, the inspectors 21A to 21C have model application areas narrowed under different conditions from each other and have different decision boundaries. Since the inspectors 21A to 21C have different decision boundaries from each other, output results sometimes differ even if the same input data is input. For example, a change in distribution of data that is likely to cause the accuracy deterioration of the machine learning model may be detected based on variations in the output results of the inspectors 21A to 21C trained by the model generation device.

Figure 7:
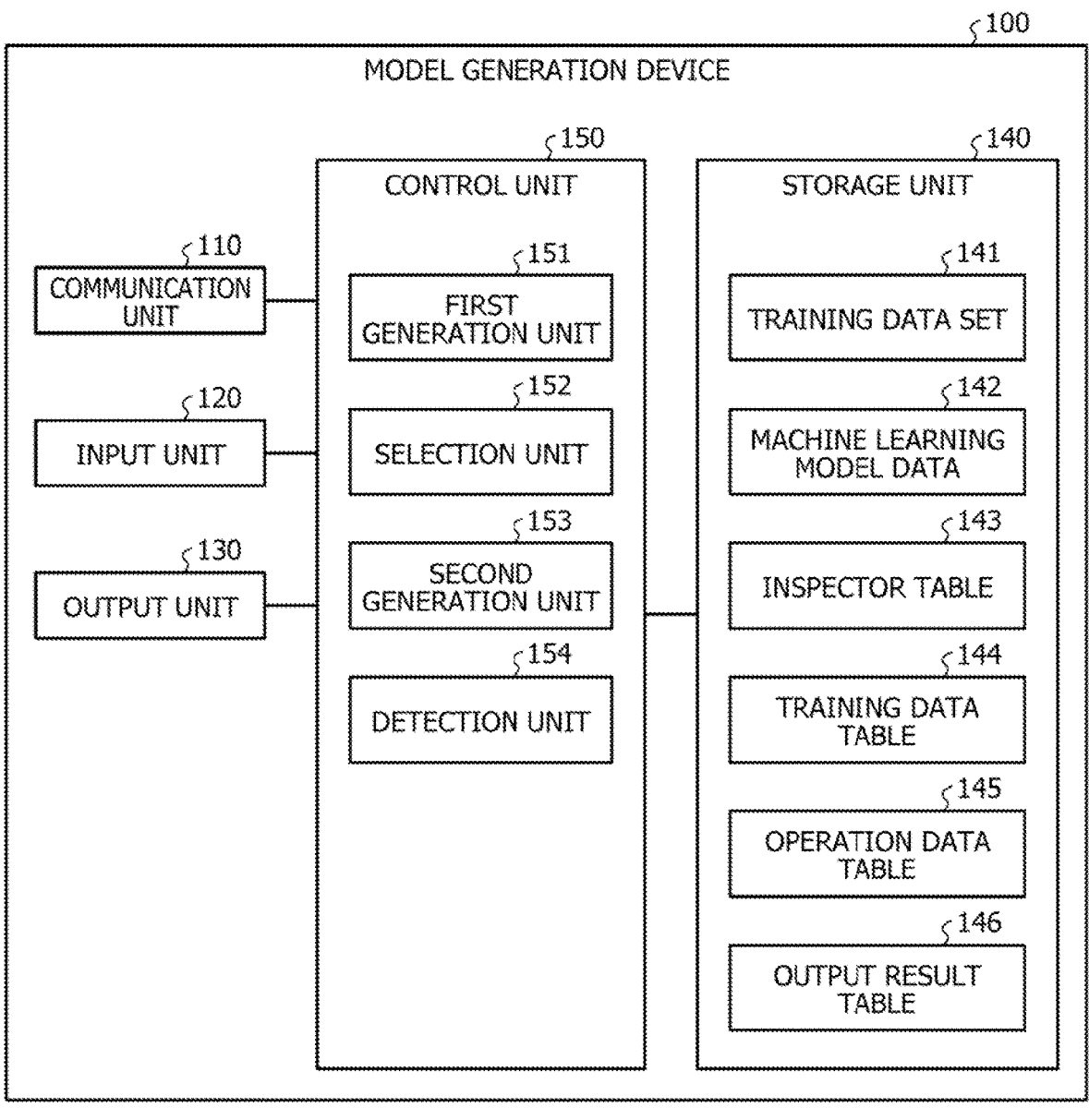
FIG. 7 is a functional block diagram illustrating a configuration of the model generation device according to the present embodiment.

Next, an example of a configuration of the model generation device according to the present embodiment will be described. FIG. 7 is a functional block diagram illustrating a configuration of the model generation device according to the present embodiment. As illustrated in FIG. 7, the model generation device according to the present embodiment includes a communication unit 110, an input unit 120, an output unit 130, a storage unit 140, and a control unit 150. A first generation unit 151 and a second generation unit 153 are examples of a generation unit.

The communication unit 110 executes data communication with an external device (not illustrated) via a network. For example, the communication unit 110 receives a training data set 141 and the like, which will be described later, from the external device.

The input unit 120 is a device or an interface for inputting data.

The output unit 130 outputs data from the control unit 150.

The storage unit 140 is an example of a storage device that stores data and a program or the like executed by the control unit 150 and, for example, is a hard disk, a memory, or the like. The storage unit 140 stores the training data set 141, machine learning model data 142, an inspector table 143, a training data table 144, an operation data table 145, and an output result table 146.

The training data set 141 holds various types of information regarding the training data. FIG. 8 is a diagram illustrating an example of a data structure of the training data set. As illustrated in FIG. 8, this training data set associates the record number with the training data and the correct answer label. The record number is a number that identifies the pair of the training data and the correct answer label. The training data corresponds to mail spam data, electricity demand forecasts, stock price forecasts, poker hand data, image data, and the like. The correct answer label is information that uniquely identifies one classification class from among the respective classification classes of the first class, the second class, and the third class.

FIG. 9 is a diagram illustrating an example of the training data. In FIG. 9, the training data will be explained as image data, but the training data may be mail spam data, electricity demand forecasts, stock price forecasts, and poker hand data. Training data TD1 and training data TD2 are image data of T-shirts and are associated with the correct answer label "first class". Training data TD3 and training data TD4 are image data of trousers and are associated with the correct answer label "second class". Training data TD5 and training data TD6 are image data of pullovers and are associated with the correct answer label "third class".

Figure 10:
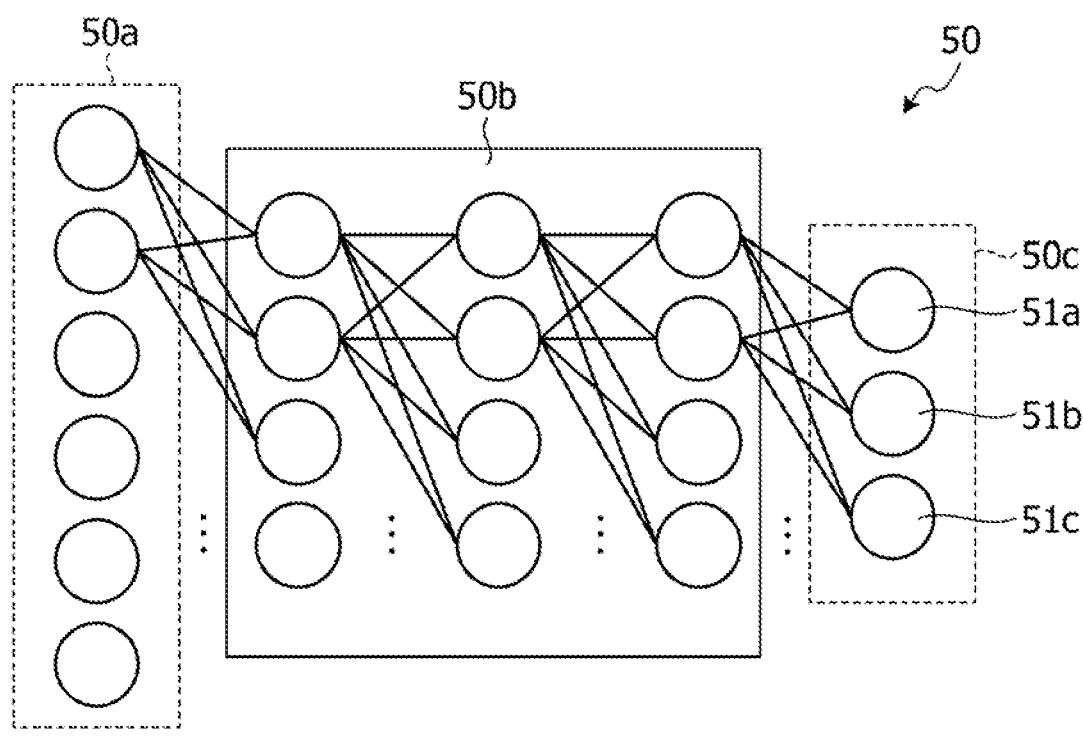
FIG. 10 is a diagram for explaining an example of the machine learning model.

The machine learning model data 142 is data of the machine learning model. FIG. 10 is a diagram for explaining an example of the machine learning model. As illustrated in FIG. 10, a machine learning model 50 has a neural network structure and has an input layer 50a, a hidden layer 50b, and an output layer 50c. The input layer 50a, the hidden layer 50b, and the output layer 50c have a structure in which a plurality of nodes is coupled by edges. The hidden layer 50b and the output layer 50c have a function called an activation function and bias values, and the edges have weights. Parameters such as the bias values and weights are set in the plurality of layers.

When data (feature amount of data) is input to each node included in the input layer 50a, the probability of each class is output from nodes 51a, 51b, and 51c of the output layer 50c through the hidden layer 50b. For example, the probability of the first class is output from the node 51a. The probability of the second class is output from the node 51b. The probability of the third class is output from the node 51c. The probability of each class is calculated by inputting the value output from each node of the output layer 50c to the Softmax function. In the present embodiment, the value before being input to the Softmax function will be treated as the "score".

For example, when the training data corresponding to the correct answer label "first class" is input to each node included in the input layer 50a, the value output from the node 51a and before being input to the Softmax function is assumed as the score of the input training data. When the training data corresponding to the correct answer label "second class" is input to each node included in the input layer 50a, the value output from the node 51b and before being input to the Softmax function is assumed as the score of the input training data. When the training data corresponding to the correct answer label "third class" is input to each node included in the input layer 50a, the value output from the node 51c and before being input to the Softmax function is assumed as the score of the input training data.

As for the machine learning model 50, it is assumed that machine learning has already been executed with the training data set 141 as input. When machine learning of the machine learning model 50 is executed, each piece of the training data of the training data set 141 is input to the input layer 50a, and the parameters of the machine learning model 50 are trained such that the output result of each node of the output layer 50c approaches the correct answer label of the input training data. For example, the machine learning model 50 is trained on parameters by backpropagation.

The description returns to FIG. 7. The inspector table 143 is a table that holds data of a plurality of inspectors that detects the accuracy deterioration of the machine learning model 50. FIG. 11 is a diagram illustrating an example of a data structure of the inspector table. As illustrated in FIG. 11, this inspector table 143 associates identification information with an inspector. The identification information is information that identifies the inspector. The inspector represents data of the inspector corresponding to the model identification information. The data of the inspector has a neural network structure similar to the machine learning model 50 described in FIG. 10 and has an input layer, a hidden layer, and an output layer. In addition, a plurality of unique parameters is set separately in each inspector.

In the following description, the inspector with identification information "M0" will be expressed as an "inspector M0". The inspector with identification information "M1" will be expressed as an "inspector M1". The inspector with identification information "M2" will be expressed as an "inspector M2". The inspector with identification information "M3" will be expressed as an "inspector M3".

The training data table 144 has a plurality of training data sets for training each inspector. FIG. 12 is a diagram illustrating an example of a data structure of the training data table. As illustrated in FIG. 12, the training data table 144 has data identification information and a training data set. The data identification information is information that identifies the training data set. The training data set is a training data set used when machine learning of each inspector is executed.

The training data set with data identification information "D1" is a training data set in which training data with the correct answer label "first class" having a low score has been excluded from the training data set 141. In the following description, the training data set with the data identification information "D1" will be expressed as a "training data set D1".

The training data set with data identification information "D2" is a training data set in which training data with the correct answer label "second class" having a low score has been excluded from the training data set 141. In the following description, the training data set with the data identification information "D2" will be expressed as a "training data set D2".

The training data set with data identification information "D3" is a training data set in which training data with the correct answer label "third class" having a low score has been excluded from the training data set 141. In the following description, the training data set with the data identification information "D3" will be expressed as a "training data set D3".

The operation data table 145 has operation data sets that are added with the passage of time. FIG. 13 is a diagram illustrating an example of a data structure of the operation data table. As illustrated in FIG. 13, the operation data table 145 has data identification information and an operation data set. The data identification information is information that identifies the operation data set. The operation data set contains a plurality of pieces of operation data. The operation data corresponds to mail spam data, electricity demand forecasts, stock price forecasts, poker hand data, image data, and the like.

The operation data set with data identification information "C0" is an operation data set collected at the start of operation (t=0). In the following description, the operation data set with the data identification information "C0" will be expressed as an "operation data set C0".

The operation data set with data identification information "C1" is an operation data set collected after T1 hours have passed from the start of operation. In the following description, the operation data set with the data identification information "C1" will be expressed as an "operation data set C1".

The operation data set with data identification information "C2" is an operation data set collected after T2 (T2>T1) hours have passed from the start of operation. In the following description, the operation data set with the data identification information "C2" will be expressed as an "operation data set C2".

The operation data set with data identification information "C3" is an operation data set collected after T3 (T3>T2) hours have passed from the start of operation. In the following description, the operation data set with the data identification information "C3" will be expressed as an "operation data set C3".

Although not illustrated, it is assumed that each piece of operation data included in the operation data sets C0 to C3 is given "operation data identification information" that uniquely identifies the operation data. The data of the operation data sets C0 to C3 is streamed from the external device to the model generation device 100, and the model generation device 100 registers the data of the operation data sets C0 to C3 that has been streamed, in the operation data table 145.

The output result table 146 is a table for registering output results of the respective inspectors M0 to M3 when the respective operation data sets C0 to C3 are input to the respective inspectors M0 to M3.

The description returns to FIG. 7. The control unit 150 is a processing unit that controls the entire model generation device 100 and includes the first generation unit 151, a selection unit 152, the second generation unit 153, and a detection unit 154. For example, the control unit 150 is a processor or the like.

The first generation unit 151 acquires the training data set 141 and inputs the training data set 141 to the inspector M0 that is not trained yet to execute machine learning of the inspector M0. The training data set 141 is a training data set used when machine learning of the machine learning model 50 is executed.

The first generation unit 151 inputs each piece of the training data of the training data set 141 to the input layer of the inspector M0 and trains a plurality of parameters of the plurality of layers of the inspector M0 such that the output result of each node of the output layer approaches the correct answer label of the input training data.

The first generation unit 151 registers data of the trained inspector M0 in the inspector table 143. The data of the inspector M0 includes the plurality of parameters set in the plurality of layers of the inspector M0. In the present embodiment, as an example, it is assumed that the inspector M0 includes n layers, and the trained parameters of each layer are $\theta_1$ to $\theta_n$.

The selection unit 152 calculates the score of each piece of the training data included in the training data set 141 and selects the training data other than the training data whose score is less than a threshold value, from the training data set 141, to generate training data sets D1 to D3.

Processing in which the selection unit 152 generates the "training data set D1" will be described. The selection unit 152 inputs the training data with the correct answer label "first class" among the training data of the training data set 141 to the inspector M0 and calculates the score. The selection unit 152 selects the training data with the correct answer label "first class" as the training data of the training data set D1 when the score is equal to or higher than the threshold value. The selection unit 152 repeatedly executes the above processing also for other pieces of the training data with the correct answer label "first class".

The selection unit 152 selects the training data with the correct answer labels "second class" and "third class" from among the training data of the training data set 141 as it is, as the training data of the training data set D1.

Processing in which the selection unit 152 generates the "training data set D2" will be described. The selection unit 152 inputs the training data with the correct answer label "second class" among the training data of the training data set 141 to the inspector M0 and calculates the score. The selection unit 152 selects the training data with the correct answer label "second class" as the training data of the training data set D2 when the score is equal to or higher than the threshold value. The selection unit 152 repeatedly executes the above processing also for other pieces of the training data with the correct answer label "second class".

The selection unit 152 selects the training data with the correct answer labels "first class" and "third class" from among the training data of the training data set 141 as it is, as the training data of the training data set D2.

Processing in which the selection unit 152 generates the "training data set D3" will be described. The selection unit 152 inputs the training data with the correct answer label "third class" among the training data of the training data set 141 to the inspector M0 and calculates the score. The selection unit 152 selects the training data with the correct answer label "third class" as the training data of the training data set D3 when the score is equal to or higher than the threshold value. The selection unit 152 repeatedly executes the above processing also for other pieces of the training data with the correct answer label "third class".

The selection unit 152 selects the training data with the correct answer labels "first class" and "second class" from among the training data of the training data set 141 as it is, as the training data of the training data set D3.

The second generation unit 153 generates the inspectors M1, M2, and M3 by executing machine learning based on the training data table 144.

Processing in which the second generation unit 153 generates the "inspector M1" will be described. By taking the training data set D1 as input and reusing the plurality of parameters of the inspector M0 as a plurality of parameters of the inspector M1, the second generation unit 153 executes machine learning with some parameters fixed and thereby generates the inspector M1.

For example, the plurality of parameters of the inspector M0 to be reused is assumed as $\theta_1$ to $\theta_n$. The second generation unit 153 sets the initial values of the parameters of the plurality of layers of the inspector M1 to the parameters $\theta_1$ to $\theta_n$. When executing machine learning by taking the training data set D1 as input, the second generation unit 153 fixes $\theta_1$ to $\theta_{n-2}$ among the parameters $\theta_1$ to $\theta_n$ of the inspector M1 and trains $\theta_1$ to $\theta_n$. The second generation unit 153 registers data of the trained inspector M1 in the inspector table 143.

Processing in which the second generation unit 153 generates the "inspector M2" will be described. By taking the training data set D2 as input and reusing the plurality of parameters of the inspector M0 as a plurality of parameters of the inspector M2, the second generation unit 153 executes machine learning with some parameters fixed and thereby generates the inspector M2.

For example, the plurality of parameters of the inspector M0 to be reused is assumed as $\theta_1$ to $\theta_n$. The second generation unit 153 sets the initial values of the parameters of the plurality of layers of the inspector M2 to the parameters $\theta_1$ to $\theta_n$. When executing machine learning by taking the training data set D2 as input, the second generation unit 153 fixes to $\theta_1$ to $\theta_{n-2}$ among the parameters $\theta_1$ to $\theta_n$ of the inspector M2 and trains $\theta_{n-1}$ and $\theta_n$. The second generation unit 153 registers data of the trained inspector M2 in the inspector table 143.

Processing in which the second generation unit 153 generates the "inspector M3" will be described. By taking the training data set D3 as input and reusing the plurality of parameters of the inspector M0 as a plurality of parameters of the inspector M3, the second generation unit 153 executes machine learning with some parameters fixed and thereby generates the inspector M3.

For example, the plurality of parameters of the inspector M0 to be reused is assumed as $\theta_1$ to $\theta_n$. The second generation unit 153 sets the initial values of the parameters of the plurality of layers of the inspector M3 to the parameters $\theta_1$ to $\theta_n$. When executing machine learning by taking the training data set D3 as input, the second generation unit 153 fixes $\theta_1$ to $\theta_{n-2}$ among the parameters $\theta_1$ to $\theta_n$ of the inspector M3 and trains $\theta_{n-1}$ and $\theta_n$. The second generation unit 153 registers data of the trained inspector M3 in the inspector table 143.

Figure 14:
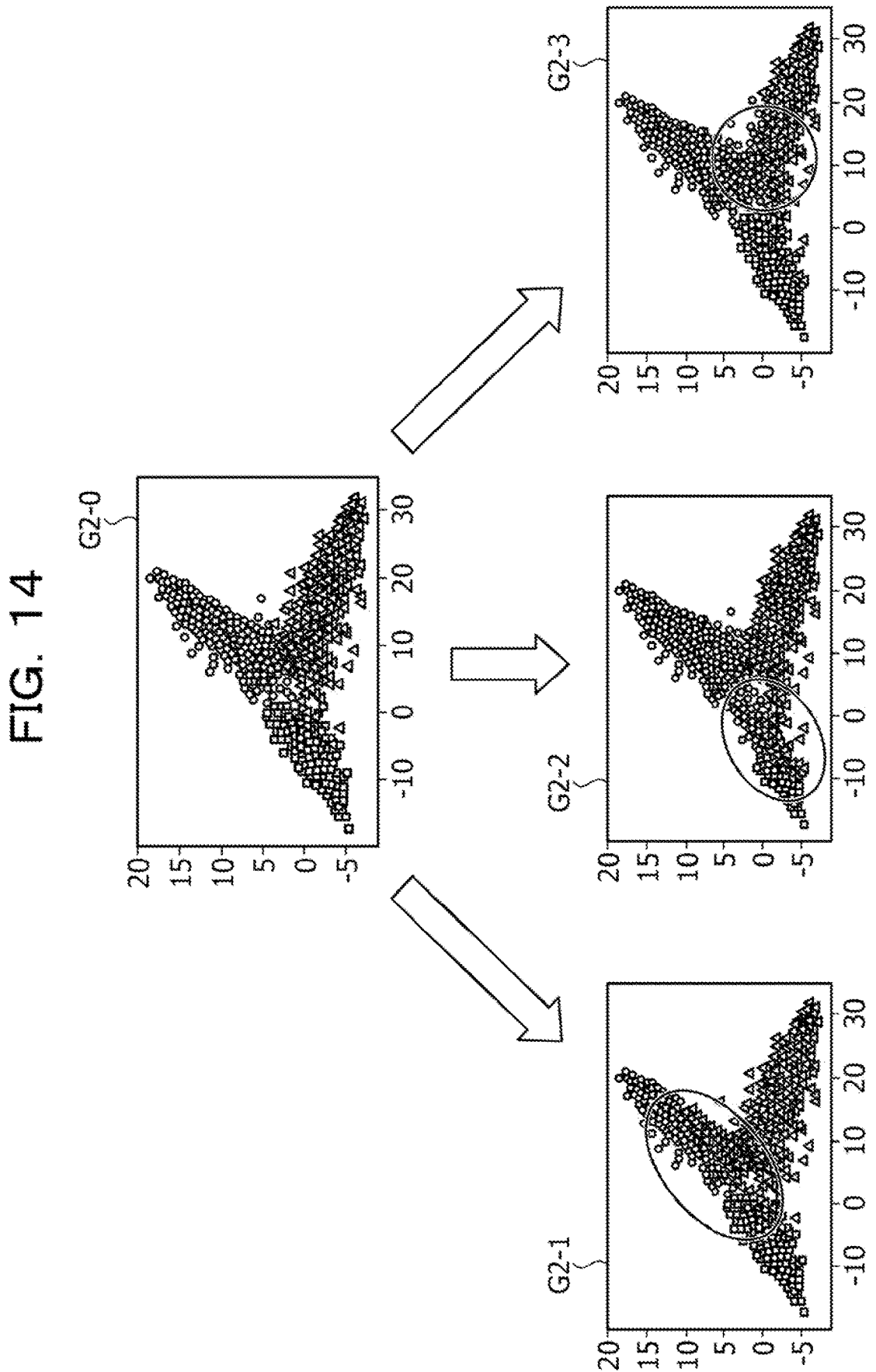
FIG. 14 is a diagram illustrating an example of classification results for each inspector.

Here, an example of the classification results of the inspectors M0, M1, M2, and M3 will be described. FIG. 14 is a diagram illustrating an example of classification results for each inspector. A graph G2-0 illustrates the classification result of the inspector M0. A graph G2-1 illustrates the classification result of the inspector M1. A graph G2-2 illustrates the classification result of the inspector M2. A graph G2-3 illustrates the classification result of the inspector M3. In each graph, the horizontal axis is the axis corresponding to a first feature amount of the data, and the vertical axis is the axis corresponding to a second feature amount of the data.

In each graph, data marked with circles is data classified into the first class. Data marked with squares is data classified into the second class. Data marked with triangles is data classified into the third class. As illustrated in the graph G2-1, the inspector M1 has a model application area of the first class narrower than the model application areas of the other inspectors M0, M2, and M3. As illustrated in the graph G2-2, the inspector M2 has a model application area of the second class narrower than the model application areas of the other inspectors M0, M1, and M3. As illustrated in the graph G2-3, the inspector M3 has a model application area of the third class narrower than the model application areas of the other inspectors M0, M1, and M2.

The description returns to FIG. 7. Based on the output result table 146, the detection unit 154 detects a change in distribution of data that is likely to cause the accuracy deterioration of the machine learning model. The detection unit 154 inputs the operation data sets C0, C1, C2, and C3 in the operation data table 145 to the inspectors M0 to M3 and acquires the output results. The detection unit 154 registers the output results of the inspectors M0 to M3 in the output result table 146.

The detection unit 154 detects a change in distribution of data that is likely to cause the accuracy deterioration (or indicates a sign of causing the accuracy deterioration) of the machine learning model 50 when any one output result among the output results of the inspectors M0 to M3 is different from the other output results. The detection unit 154 notifies the external device that a change in distribution of data has been detected.

Figure 15:
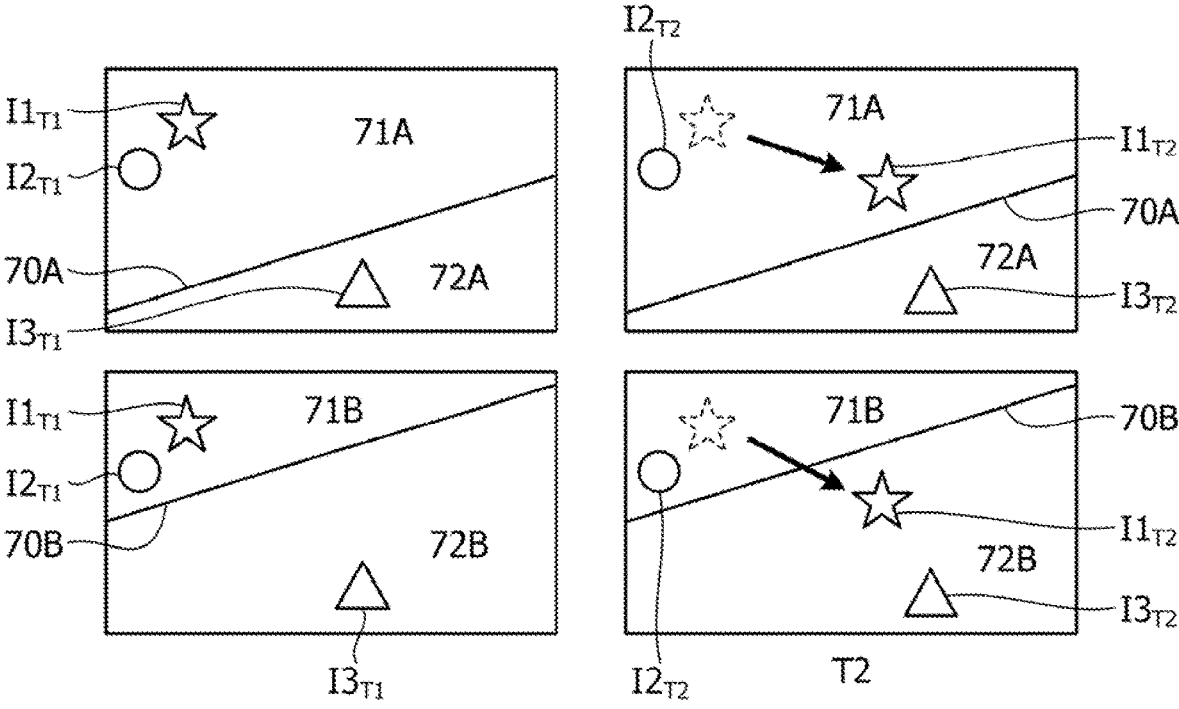
FIG. 15 is a diagram for explaining processing of a detection unit.

FIG. 15 is a diagram for explaining processing of the detection unit. Here, as an example, the inspectors M0 and M1 will be used for description. For convenience, the decision boundary of the inspector M0 is assumed as a decision boundary 70A, and the decision boundary of the inspector M1 is assumed as a decision boundary 70B. The positions of the decision boundary 70A and the decision boundary 70B are different from each other, which forms different model application areas. In the following description, one piece of operation data included in the operation data set will be appropriately expressed as an "instance".

When an instance is located in a model application area 71A, the instance is classified by the inspector M0 into the first class. When an instance is located in a model application area 72A, the instance is classified by the inspector M0 into the second class.

When an instance is located in a model application area 71B, the instance is classified by the inspector M1 into the first class. When an instance is located in a model application area 72B, the instance is classified by the inspector M1 into the second class.

For example, at a time T1 in the initial stage of operation, when an instance $I1_{T1}$ is input to the inspector M0, the instance $I1_{T1}$ is positioned in the model application area 71A and therefore classified into the "first class". When an instance $I2_{T1}$ is input to the inspector M0, the instance $I2_{T1}$ is positioned in the model application area 71A and therefore classified into the "first class". When an instance $I3_{T1}$ is input to the inspector M0, the instance $I3_{T1}$ is positioned in the model application area 72A and therefore classified into the "second class".

At the time T1 in the initial stage of operation, when the instance $I1_{T1}$ is input to the inspector M1, the instance $I1_{T1}$ is positioned in the model application area 71B and therefore classified into the "first class". When the instance $I2_{T1}$ is input to the inspector M1, the instance $I2_{T1}$ is positioned in the model application area 71B and therefore classified into the "first class". When the instance $I3_{T1}$ is input to the inspector M1, the instance $I3_{T1}$ is positioned in the model application area 72B and therefore classified into the "second class".

Since the classification results classified when the instances $I1_{T1}$, $I2_{T1}$, and $I3_{T1}$ are input to the inspectors M0 and M1 are the same as each other at the time T1 in the initial stage of operation, the detection unit 154 does not detect the accuracy deterioration of the machine learning model 50.

Incidentally, at a time T2 when some time has passed since the initial stage of operation, the tendency of the instances changes, and the instances $I2_{T1}$, $I2_{T1}$, and $I3_{T1}$ become instances $I1_{T2}$, $I2_{T2}$, and $I3_{T2}$. When the instance $I1_{T2}$ is input to the inspector M0, the instance $I1_{T2}$ is positioned in the model application area 71A and therefore classified into the "first class". When the instance $I2_{T2}$ is input to the inspector M0, the instance $I2_{T1}$ is positioned in the model application area 71A and therefore classified into the "first class". When the instance $I3_{T2}$ is input to the inspector M0, the instance $I3_{T2}$ is positioned in the model application area 72A and therefore classified into the "second class".

At the time T2 when some time has passed since the initial stage of operation, when the instance $I1_{T2}$ is input to the inspector M1, the instance $I1_{T2}$ is positioned in the model application area 72B and therefore classified into the "second class". When the instance $I2_{T2}$ is input to the inspector M1, the instance $I2_{T2}$ is positioned in the model application area 71B and therefore classified into the "first class". When the instance $I3_{T2}$ is input to the inspector M1, the instance $I3_{T2}$ is positioned in the model application area 72B and therefore classified into the "second class".

Since the classification results classified when the instance $I1_{T2}$ is input to the inspectors M0 and M1 are different from each other at the time T2 when some time has passed since the initial stage of operation, the detection unit 154 detects a change in distribution of data that is likely to cause the accuracy deterioration of the machine learning model 50. In addition, the detection unit 154 can detect the instance $I1_{T2}$ that has been a factor of the accuracy deterioration.

Figure 16:
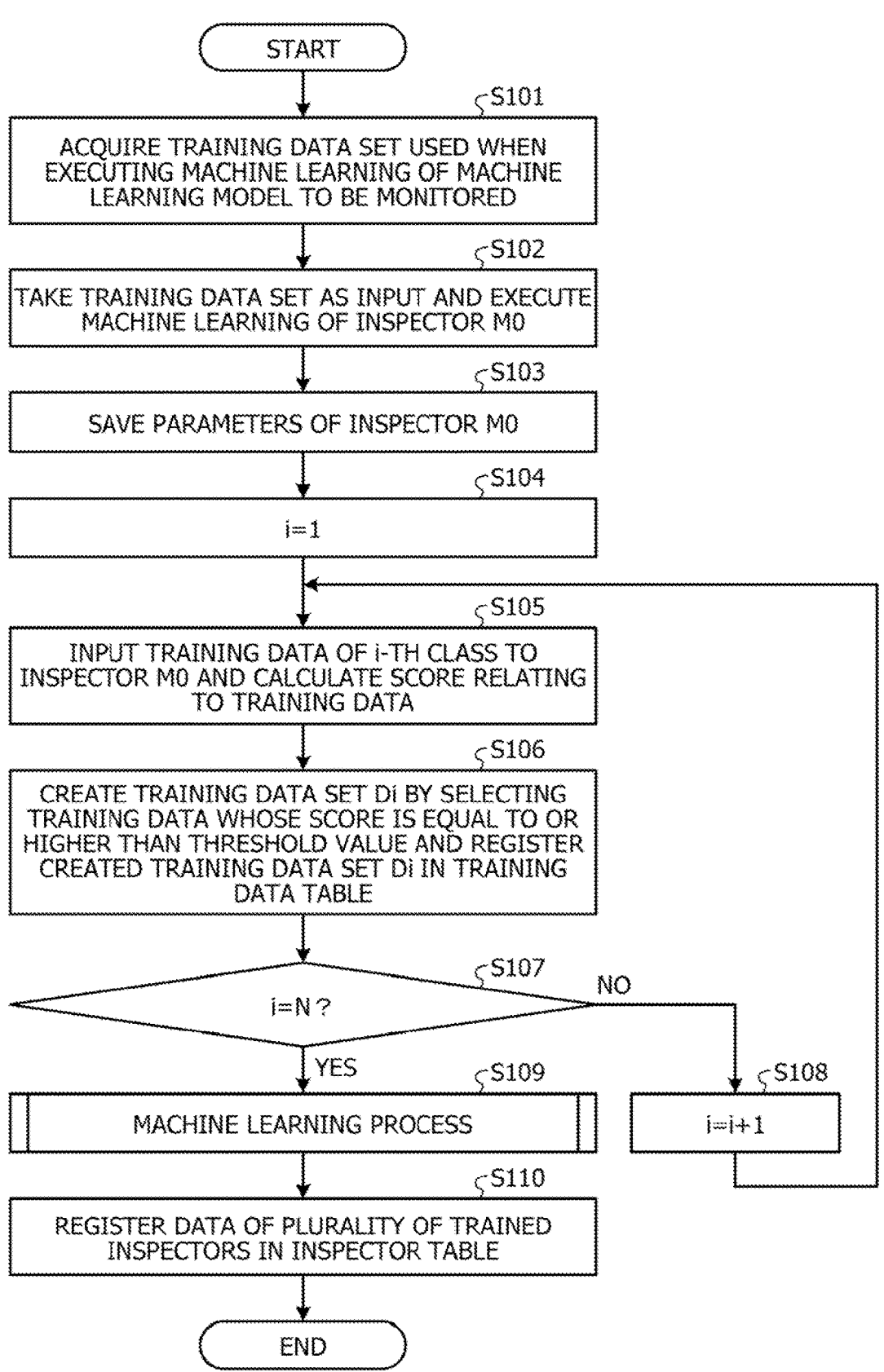
FIG. 16 is a flowchart (1) illustrating a processing procedure of the model generation device according to the present embodiment.

Next, an example of a processing procedure of the model generation device according to the present embodiment will be described. FIG. 16 is a flowchart (1) illustrating a processing procedure of the model generation device according to the present embodiment. As illustrated in FIG. 16, the model generation device 100 acquires the training data set 141 used when executing machine learning of the machine learning model 50 to be monitored (step S101).

The first generation unit 151 of the model generation device 100 takes the training data set 141 as input and executes machine learning of the inspector M0 (step S102). The first generation unit 151 saves the parameters of the inspector M0 in the inspector table 143 (step S103).

The selection unit 152 of the model generation device 100 sets i=1 (step S104). The selection unit 152 inputs training data of an i-th class to the inspector M0 and calculates the score relating to the training data (step S105). The selection unit 152 creates a training data set Di by selecting training data whose score is equal to or higher than the threshold value and registers the created training data set Di in the training data table (step S106).

When i=N is not true (step S107, No), the selection unit 152 executes i=i+1 (step S108) and proceeds to step S105. On the other hand, when i=N is true (step S107, Yes), the selection unit 152 proceeds to step S109.

The second generation unit 153 executes a machine learning process (step S109). The second generation unit 153 registers data of a plurality of trained inspectors in the inspector table 143 (step S110).

Figure 17:
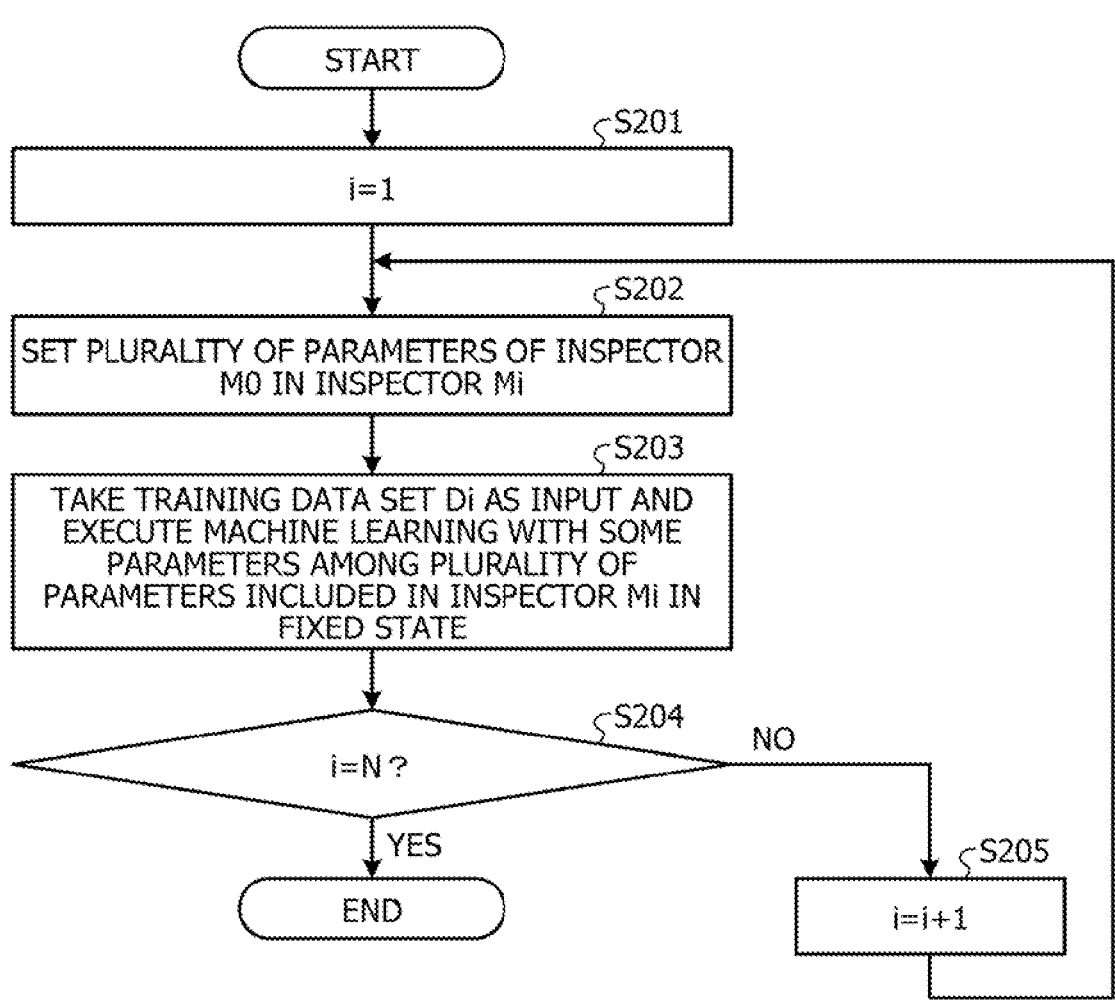
FIG. 17 is a flowchart illustrating a processing procedure of a machine learning process.

Next, a processing procedure of the machine learning process indicated in step S109 in FIG. 16 will be described. FIG. 17 is a flowchart illustrating a processing procedure of the machine learning process. As illustrated in FIG. 17, the second generation unit 153 of the model generation device 100 sets i=1 (step S201).

The second generation unit 153 sets a plurality of parameters of the inspector M0 in an inspector Mi (step S202). The second generation unit 153 takes the training data set Di as input and executes machine learning with some parameters among the plurality of parameters included in the inspector Mi fixed (step S203).

When i=N is not true (step S204, No), the second generation unit 153 executes i=i+1 (step S205) and proceeds to step S202. On the other hand, when i=N is true (step S204, Yes), the second generation unit 153 ends the machine learning process.

Figure 18:
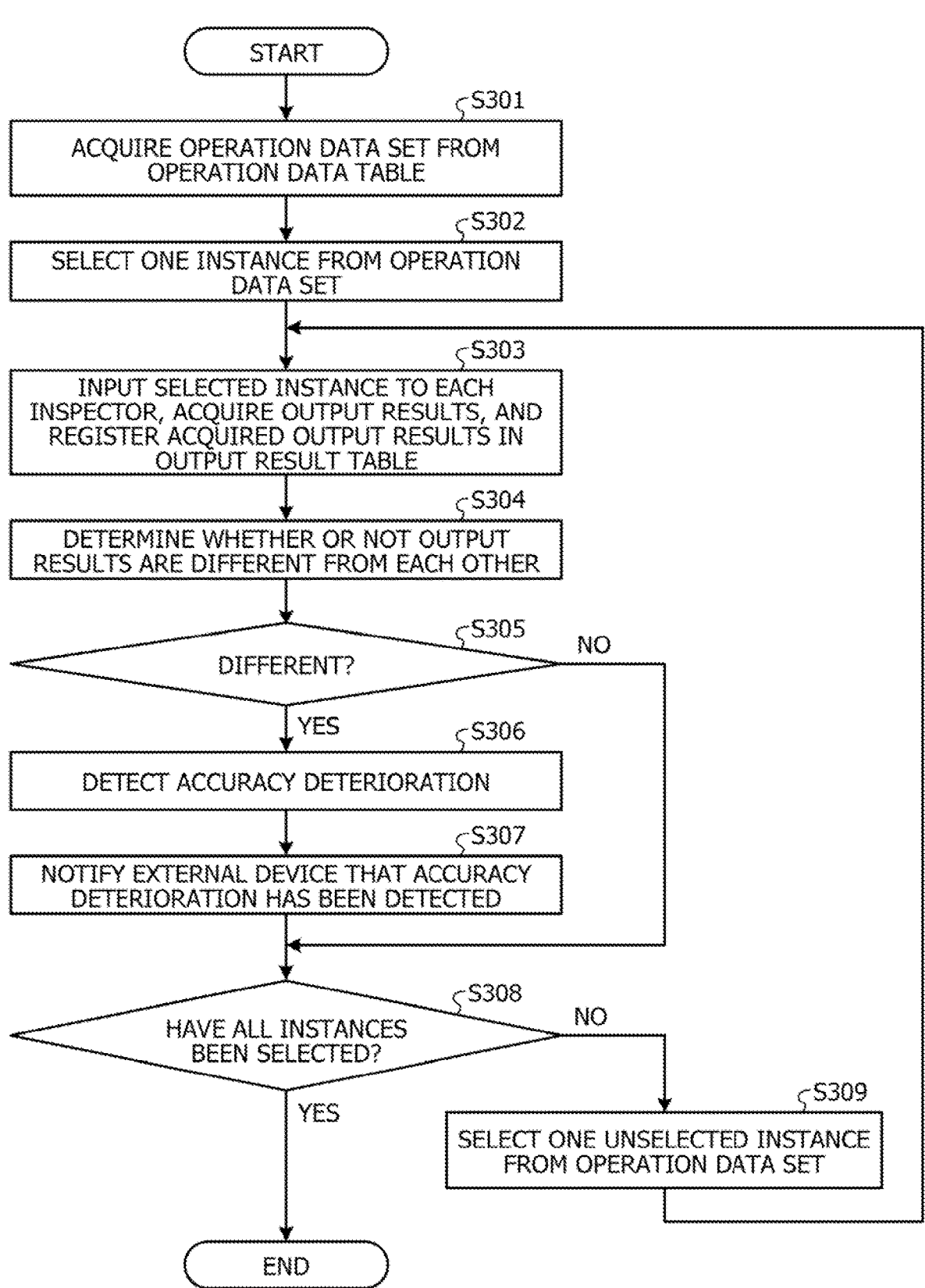
FIG. 18 is a flowchart (2) illustrating a processing procedure of the model generation device according to the present embodiment.

FIG. 18 is a flowchart (2) illustrating a processing procedure of the model generation device according to the present embodiment. As illustrated in FIG. 18, the detection unit 154 of the model generation device 100 acquires an operation data set from the operation data table 145 (step S301). The detection unit 154 selects one instance from the operation data set (step S302).

The detection unit 154 inputs the selected instance to each of the inspectors M0 to M3, acquires output results, and registers the acquired output results in the output result table 146 (step S303). The detection unit 154 refers to the output result table 146 to determine whether or not the output results are different from each other (step S304).

When the output results are not different from each other (step S305, No), the detection unit 154 proceeds to step S308. When the output results are different from each other (step S305, Yes), the detection unit 154 proceeds to step S306.

The detection unit 154 detects the accuracy deterioration (step S306). The detection unit 154 notifies the external device that the accuracy deterioration has been detected (step S307). The model generation device 100 determines whether or not all the instances have been selected (step S308).

When all the instances have been selected (step S308, Yes), the model generation device 100 ends the process. On the other hand, when all the instances have not been selected (step S308, No), the model generation device 100 proceeds to step S309. The detection unit 154 selects one unselected instance from the operation data set (step S309) and proceeds to step S303.

Next, an effect of the model generation device 100 according to the present embodiment will be described. When executing machine learning of the inspectors M1 to M3, the model generation device 100 reuses a plurality of trained parameters of the inspector M0 and executes machine learning with some parameters fixed. Therefore, the computational cost of the inspectors M1 to M3 may be implemented at a lower computational cost than the computational cost of the inspector M0. Since the computational cost of the inspectors M1 to M3 can be implemented at a lower computational cost, the computational cost involved in continuous operation monitoring of the machine learning model may be reduced.

Figure 19:
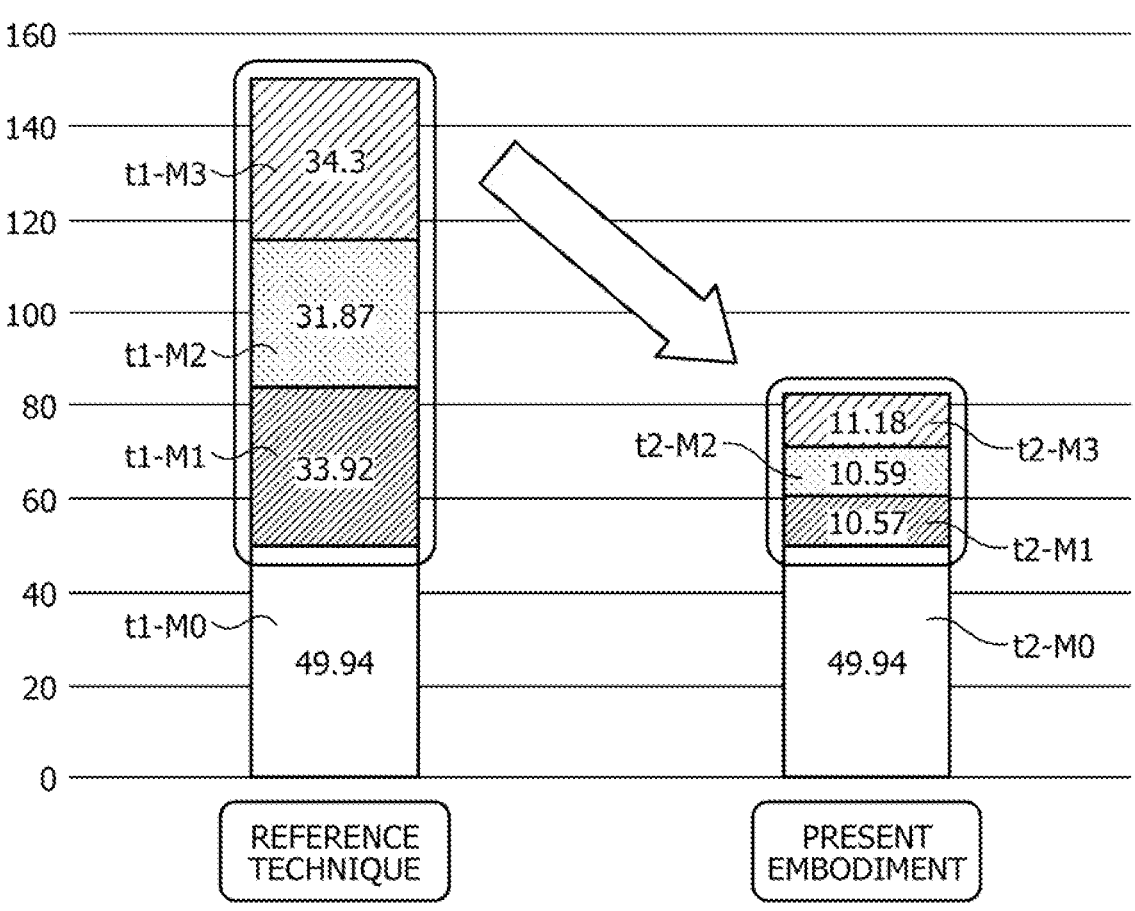
FIG. 19 is a diagram for explaining an effect of the model generation device according to the present embodiment.

FIG. 19 is a diagram for explaining an effect of the model generation device according to the present embodiment. In FIG. 19, the time involved when the reference device trains the inspector M0 is represented by t1-M0. The time involved when the reference device trains the inspector M1 is represented by t1-M1. The time involved when the reference device trains the inspector M2 is represented by t1-M2. The time involved when the reference device trains the inspector M3 is represented by t1-M3.

For example, t1-M0 has "49.9 seconds", t1-M1 has "33.92 seconds", t1-M2 has "31.87 seconds", and t1-M3 has "34.3 seconds". Therefore, the reference device takes "150.03 seconds" to train the inspectors M0 to M3.

The time involved when the model generation device 100 trains the inspector M0 is represented by t2-M0. The time involved when the model generation device 100 trains the inspector M1 is represented by t2-M1. The time involved when the model generation device 100 trains the inspector M2 is represented by t2-M2. The time involved when the model generation device 100 trains the inspector M3 is represented by t2-M3.

For example, t2-M0 has "49.9 seconds", t2-M1 has "10.57 seconds", t2-M2 has "10.59 seconds", and t2-M3 has "11.18 seconds". Therefore, the model generation device 100 takes "82.28 seconds" to train the inspectors M0 to M3.

As illustrated in FIG. 19, the time for the model generation device 100 to train the inspectors M0 to M3 is shorter than the time for the reference device to train the inspectors M0 to M3, and the computational cost may be reduced.

In addition, the inspectors M1 to M3 have model application areas narrowed under different conditions from each other and have different decision boundaries. Since the inspectors M1 to M3 have different decision boundaries from each other, output results sometimes differ even if the same input data is input. For example, in the data of the operation data set, the model generation device 100 may detect a change in distribution of data that is likely to cause the accuracy deterioration of the machine learning model, based on variations in the output results of the inspectors M1 to M3.

The model generation device 100 generates the inspector M0 by executing machine learning with the training data set 141 as input. This allows to train a plurality of parameters to be initially set in the inspectors M1 to M3.

The model generation device 100 inputs each piece of the training data of the training data set 141 to the inspector M0 to acquire the score of each piece of the training data and selects training data whose score is equal to or higher than the threshold value, as training data when machine learning of the inspectors M1 to M3 is executed using the training data whose score is equal to or higher than the threshold value. This may generate the inspectors M1 to M3 having model application areas narrowed under different conditions from each other and different decision boundaries.

When detecting a change in distribution of data that is likely to cause the accuracy deterioration of the machine learning model, the model generation device 100 notifies the external device of this change in distribution of the data. This allows to notify the external device of the accuracy deterioration of the machine learning model 50.

Figure 20:
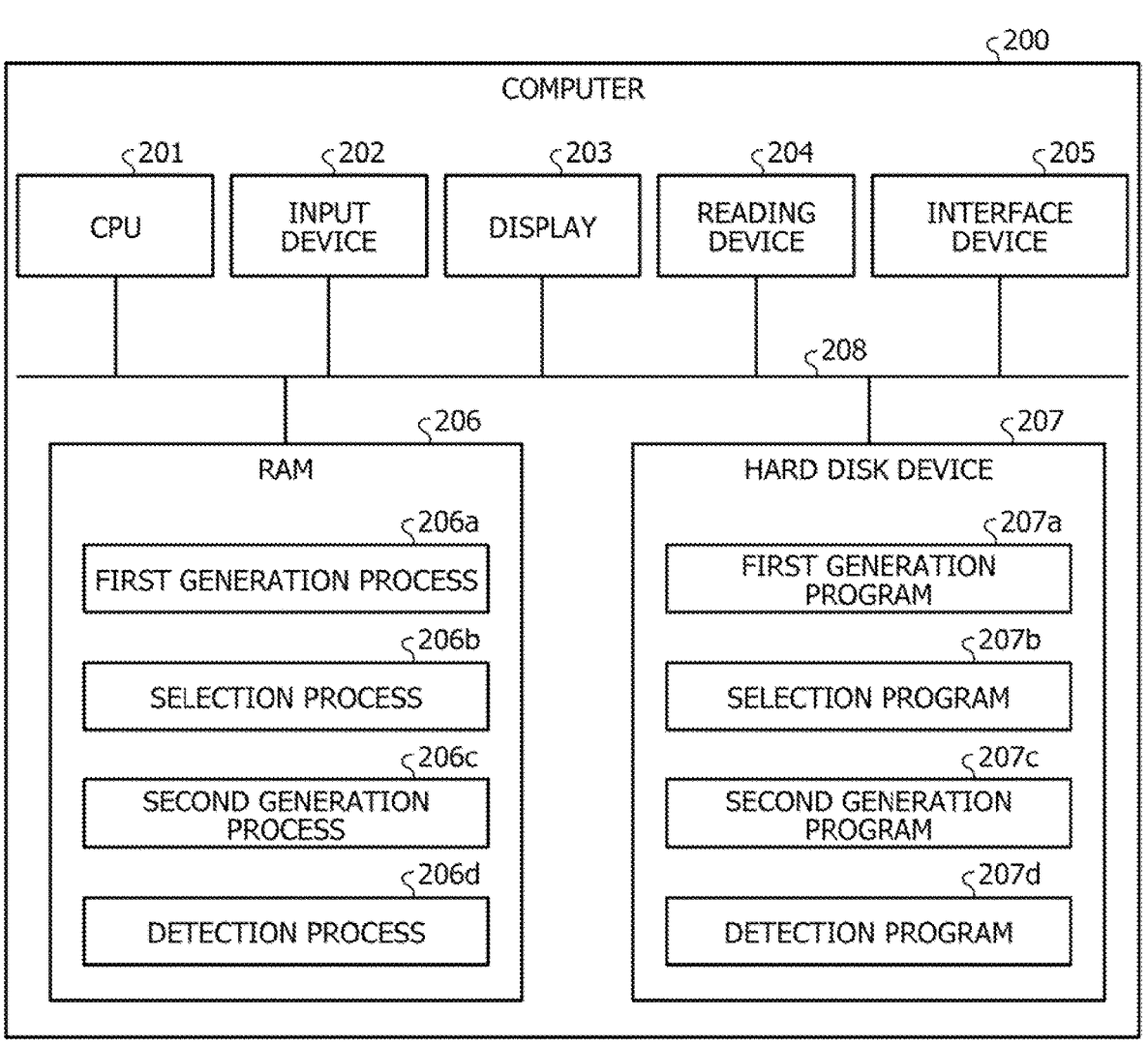
FIG. 20 is a diagram illustrating an example of a hardware configuration of a computer that implements functions similar to the functions of the model generation device according to the present embodiment.

Next, an example of a hardware configuration of a computer that implements functions similar to the functions of the model generation device 100 described in the present embodiment will be described. FIG. 20 is a diagram illustrating an example of a hardware configuration of a computer that implements functions similar to the functions of the model generation device according to the present embodiment.

As illustrated in FIG. 20, a computer 200 includes a central processing unit (CPU) 201 that executes various types of arithmetic processing, an input device 202 that accepts data input from a user, and a display 203. The computer 200 also includes a reading device 204 that reads a program and the like from a storage medium, and an interface device 205 that exchanges data with an external device or the like via a wired or wireless network. The computer 200 includes a random access memory (RAM) 206 that temporarily stores various types of information, and a hard disk device 207. Additionally, each of the devices 201 to 207 is coupled to a bus 208.

The hard disk device 207 has a first generation program 207a, a selection program 207b, a second generation program 207c, and a detection program 207d. The CPU 201 reads the first generation program 207a, the selection program 207b, the second generation program 207c, and the detection program 207d and loads the read first generation program 207a, selection program 207b, second generation program 207c, and detection program 207d into the RAM 206.

The first generation program 207a functions as a first generation process 206a. The selection program 207b functions as a selection process 206b. The second generation program 207c functions as a second generation process 206c. The detection program 207d functions as a detection process 206d.

The processing of the first generation process 206a corresponds to the processing of the first generation unit 151. The processing of the selection process 206b corresponds to the processing of the selection unit 152. The processing of the second generation process 206c corresponds to the processing of the second generation unit 153. The processing of the detection process 206*d* corresponds to the processing of the detection unit 154.

Note that each of the programs 207*a* to 207*d* may not necessarily have to be stored in the hard disk device 507 beforehand. For example, each of the programs is stored in a "portable physical medium" to be inserted in the computer 200, such as a flexible disk (FD), a compact disc read only memory (CD-ROM), a digital versatile disc (DVD) disk, a magneto-optical disk, or an integrated circuit (IC) card. Then, the computer 200 may read and execute each of the programs 207*a* to 207*d*.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a model generation program for causing a computer to execute a process comprising:

acquiring results output from a first machine learning model in response to input of a first plurality of pieces of data to the first machine learning model;

selecting a second plurality of pieces of data from the first plurality of pieces of data, based on the results;

generating a second machine learning model by executing machine learning of the first machine learning model, by using the second plurality of pieces of data as input, with some parameters being fixed among a plurality of parameters included in the first machine learning model; and detecting a change between distribution of the first plurality of pieces of data and distribution of the third plurality of pieces of data, based on the results output from the first machine learning model in response to the input of a third plurality of pieces of data to the first machine learning model and the results output from the second machine learning model in response to the input of the third plurality of pieces of data to the second machine learning model.

2. The non-transitory computer-readable recording medium according to claim 1, for further causing the computer to execute the process comprising generating the first machine learning model by executing the machine learning based on the first plurality of pieces of data.

3. The non-transitory computer-readable recording medium according to claim 2, wherein the results are scores calculated while the first machine learning model is outputting final results for each of the first plurality of pieces of data, and the selecting includes selecting the second plurality of pieces of data of which the scores are equal to or higher than a threshold value, from among the first plurality of pieces of data.

4. The non-transitory computer-readable recording medium according to claim 1, for further causing the computer to execute the process comprising making a notification of information regarding accuracy deterioration of the first machine learning model when the change in distribution of the first plurality of pieces of data is detected by the detecting.

5. A model generation method comprising:

acquiring results output from a first machine learning model in response to input of a first plurality of pieces of data to the first machine learning model;

selecting a second plurality of pieces of data from the first plurality of pieces of data, based on the results;

generating a second machine learning model by executing machine learning of the first machine learning model, by using the second plurality of pieces of data as input, with some parameters being fixed among a plurality of parameters included in the first machine learning model; and detecting a change between distribution of the first plurality of pieces of data and distribution of the third plurality of pieces of data, based on the results output from the first machine learning model in response to the input of a third plurality of pieces of data to the first machine learning model and the results output from the second machine learning model in response to the input of the third plurality of pieces of data to the second machine learning model.

6. The model generation method according to claim 5, for further causing the computer to execute the process comprising generating the first machine learning model by executing the machine learning based on the first plurality of pieces of data.

7. The model generation method according to claim 6, wherein the results are scores calculated while the first machine learning model is outputting final results for each of the first plurality of pieces of data, and the selecting includes selecting the second plurality of pieces of data of which the scores are equal to or higher than a threshold value, from among the first plurality of pieces of data.

8. The model generation method according to claim 5, for further causing the computer to execute the process comprising making a notification of information regarding accuracy deterioration of the first machine learning model when the change in distribution of the first plurality of pieces of data is detected by the detecting.

9. A model generation device comprising:

a memory; and a processor coupled to the memory and configured to:

acquire results output from a first machine learning model in response to input of a first plurality of pieces of data to the first machine learning model;

select a second plurality of pieces of data from the first plurality of pieces of data, based on the results;

generate a second machine learning model by executing machine learning of the first machine learning model, by using the second plurality of pieces of data as input, with some parameters being fixed among a plurality of parameters included in the first machine learning model; and detect a change between distribution of the first plurality of pieces of data and distribution of the third plurality of pieces of data, based on the results output from the first machine learning model in response to the input of a third plurality of pieces of data to the first machine learning model and the results output from the second machine learning model in response to the input of the third plurality of pieces of data to the second machine learning model.

10. The model generation device according to claim 9, wherein the processor generates the first machine learning model by executing the machine learning based on the first plurality of pieces of data.

11. The model generation device according to claim 10, wherein the results are scores calculated while the first machine learning model is outputting final results for each of the first plurality of pieces of data, and the processor selects the second plurality of pieces of data of which the scores are equal to or higher than a threshold value, from among the first plurality of pieces of data.

12. The model generation device according to claim 9, wherein the processor makes a notification of information regarding accuracy deterioration of the first machine learning model when the change in distribution of the first plurality of pieces of data is detected by the detecting.

\*  \*  \*  \*  \*